(12) United States Patent
Niino

(10) Patent No.: US 12,320,518 B2
(45) Date of Patent: Jun. 3, 2025

(54) LIGHT EMITTER

(71) Applicant: KYOCERA Corporation, Kyoto (JP)

(72) Inventor: Noritaka Niino, Soraku-gun (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 18/690,359

(22) PCT Filed: Sep. 1, 2022

(86) PCT No.: PCT/JP2022/032966
§ 371 (c)(1),
(2) Date: Mar. 8, 2024

(87) PCT Pub. No.: WO2023/037958
PCT Pub. Date: Mar. 16, 2023

(65) Prior Publication Data
US 2024/0410550 A1    Dec. 12, 2024

(30) Foreign Application Priority Data

Sep. 9, 2021 (JP) ................................. 2021-146916

(51) Int. Cl.
*F21V 9/32* (2018.01)
*F21V 8/00* (2006.01)
(Continued)

(52) U.S. Cl.
CPC .............. *F21V 9/32* (2018.02); *G02B 6/0006* (2013.01); *G02B 6/001* (2013.01); *F21Y 2113/13* (2016.08); *F21Y 2115/30* (2016.08)

(58) Field of Classification Search
CPC ... G02B 6/001; F21V 7/30; F21V 9/32; F21V 8/00; G02F 2201/02; F21Y 115/30; F21Y 113/13
See application file for complete search history.

(56) References Cited

U.S. PATENT DOCUMENTS 5,579,429 A * 11/1996 Naum .................. G02B 6/3855
385/127
6,347,172 B1 * 2/2002 Keller .................... G02B 6/562
385/102
(Continued)

FOREIGN PATENT DOCUMENTS

JP     2007-258466 A     10/2007
JP     2008-262743 A     10/2008
(Continued)

*Primary Examiner* — William J Carter
(74) *Attorney, Agent, or Firm* — Volpe Koenig

(57) ABSTRACT

A light-emitting member includes an optical fiber that receives first excitation light and first mixed light. The optical fiber includes a first wavelength converter that emits first fluorescence in response to the first excitation light, and emits second mixed light being a mixture of the first mixed light and the first fluorescence through a side surface. The light-emitting member includes a light-emitting portion that emits the second mixed light outside the light-emitting member. A plurality of component light beams of the first mixed light includes first component light with a first peak wavelength and second component light with a second peak wavelength longer than the first peak wavelength. An absolute value of a difference between a first fluorescence peak wavelength of the first fluorescence and the first peak wavelength is less than an absolute value of a difference between the first fluorescence peak wavelength and the second peak wavelength.

19 Claims, 16 Drawing Sheets

(51) Int. Cl.
*F21Y 113/13* (2016.01)
*F21Y 115/30* (2016.01)

(56) References Cited

U.S. PATENT DOCUMENTS

| | | | | |
|---|---|---|---|---|
| 6,519,401 | B1* | 2/2003 | Imamura | B29C 48/05 |
| | | | | 362/558 |
| 7,780,326 | B2* | 8/2010 | Ito | A61B 1/0653 |
| | | | | 362/555 |
| 8,897,612 | B2* | 11/2014 | Logunov | F21V 13/02 |
| | | | | 385/125 |
| 9,541,694 | B2* | 1/2017 | Tissot | G02B 6/0031 |
| 10,101,553 | B2* | 10/2018 | Bauco | G02B 6/447 |
| 10,107,983 | B2* | 10/2018 | Modavis | G02B 6/4495 |
| 10,175,406 | B2* | 1/2019 | Tissot | G02B 6/0076 |
| 2005/0012076 | A1* | 1/2005 | Morioka | C09K 11/06 |
| | | | | 252/301.4 R |
| 2010/0053970 | A1 | 3/2010 | Sato et al. | |
| 2010/0283376 | A1* | 11/2010 | Kanade | H01J 61/48 |
| | | | | 313/483 |
| 2012/0106127 | A1* | 5/2012 | Hattori | F21K 9/61 |
| | | | | 362/84 |
| 2014/0098011 | A1* | 4/2014 | Gollier | G02B 6/03644 |
| | | | | 345/55 |

FOREIGN PATENT DOCUMENTS

| | | | |
|---|---|---|---|
| JP | 2010-056003 A | 3/2010 | |
| JP | 2012-099362 A | 5/2012 | |

* cited by examiner

LIGHT EMITTER

TECHNICAL FIELD

The present disclosure relates to a light emitter.

BACKGROUND OF INVENTION

Patent Literature 1 describes a technique for a light emitter.

CITATION LIST

Patent Literature

Patent Literature 1: Japanese Unexamined Patent Application Publication No. 2007-258466

SUMMARY

One or more aspects of the present disclosure are directed to a light emitter. In one embodiment, the light emitter includes a light source unit and a light-emitting member. The light source unit emits first excitation light and first mixed light. The first mixed light is a mixture of a plurality of component light beams with different peak wavelengths. The light-emitting member includes an optical fiber that receives the first excitation light and the first mixed light. The optical fiber includes a first wavelength converter that emits first fluorescence in response to the first excitation light, and emits second mixed light being a mixture of the first mixed light and the first fluorescence through a side surface of the optical fiber. The light-emitting member includes a light-emitting portion that emits the second mixed light outside the light-emitting member. The plurality of component light beams includes first component light with a first peak wavelength and second component light with a second peak wavelength longer than the first peak wavelength. An absolute value of a difference between a first fluorescence peak wavelength of the first fluorescence and the first peak wavelength is less than an absolute value of a difference between the first fluorescence peak wavelength and the second peak wavelength.

DESCRIPTION OF EMBODIMENTS

Figure 1:
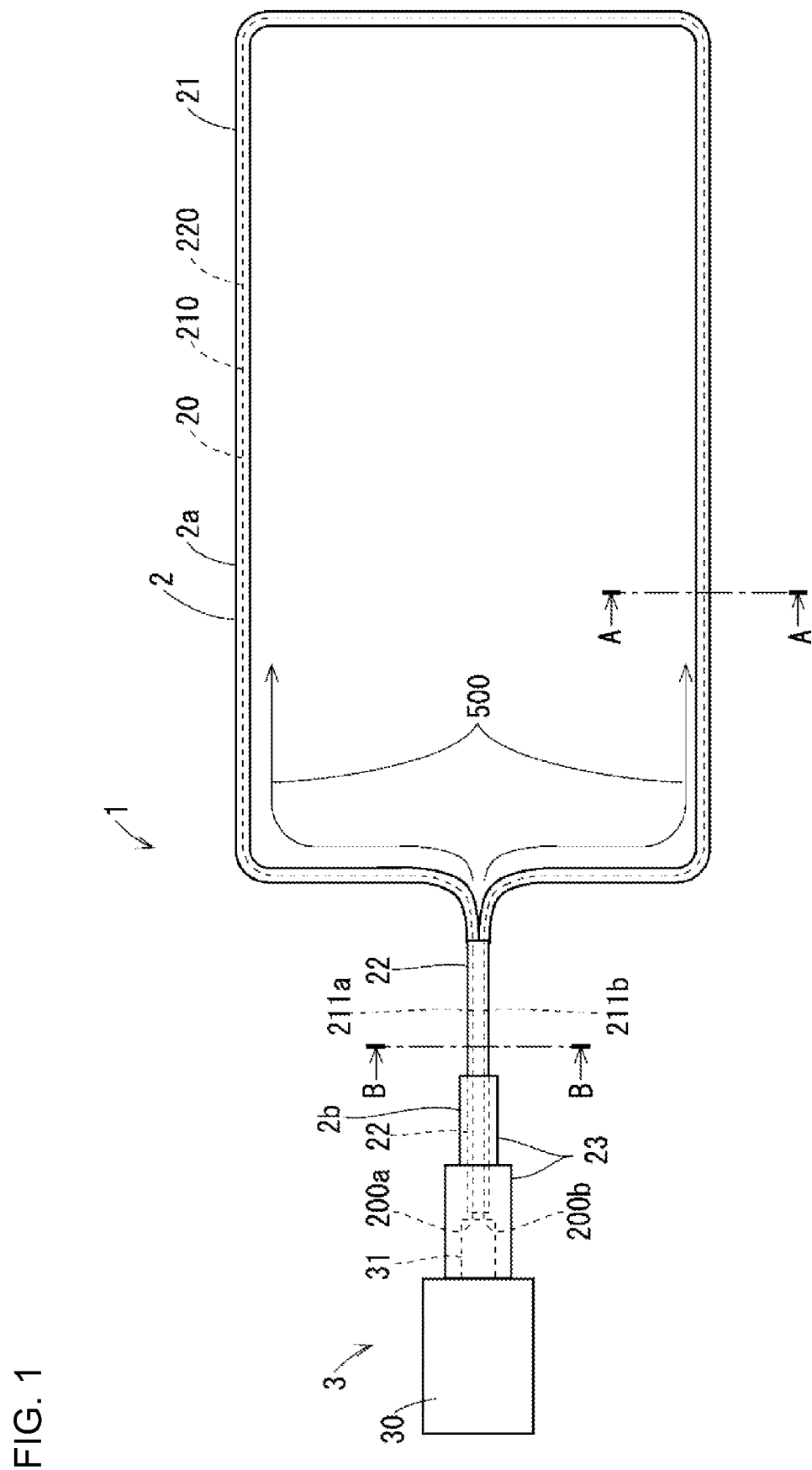
FIG. 1 is a schematic diagram of a light emitter illustrating its example structure.

FIG. 1 is a schematic diagram of a light emitter 1 illustrating its example structure. The light emitter 1 emits, for example, mixed light being a mixture of multiple light beams into a space outside the light emitter 1. The mixed light emitted by the light emitter 1 may be used for illumination, decorative illumination, or other purposes.

As illustrated in FIG. 1, the light emitter 1 includes, for example, a light source unit 3 and a light-emitting member 2 that emits light, which is emitted by the light source unit 3, outside the light emitter 1. The light-emitting member 2 includes, for example, multiple optical fibers 20. In FIG. 1, the broken line indicates one of the multiple optical fibers 20. The light-emitting member 2 emits mixed light, which is emitted through side surfaces of the optical fibers 20, outside the light-emitting member 2. The light-emitting member 2 may include a single optical fiber 20.

The light source unit 3 emits, for example, first excitation light and first mixed light being a mixture of multiple light beams with different peak wavelengths. The first mixed light and the first excitation light enter each optical fiber 20. The optical fiber 20 includes a wavelength converter that emits fluorescence in response to the first excitation light. The optical fiber 20 emits the first mixed light through its side surface. The optical fiber 20 emits second mixed light being a mixture of the first mixed light and the fluorescence through its side surface. The first mixed light and the second mixed light emitted through the side surface of the optical fiber 20 are emitted outside the light-emitting member 2. The light emitter 1 thus emits the first mixed light and the second mixed light into a space outside the light emitter 1. The first mixed light and the second mixed light are, for example, visible light. The first mixed light and the second mixed light may be used for illumination, decorative illumination, or other purposes.

Example Structure of Light Source Unit

Figure 2:
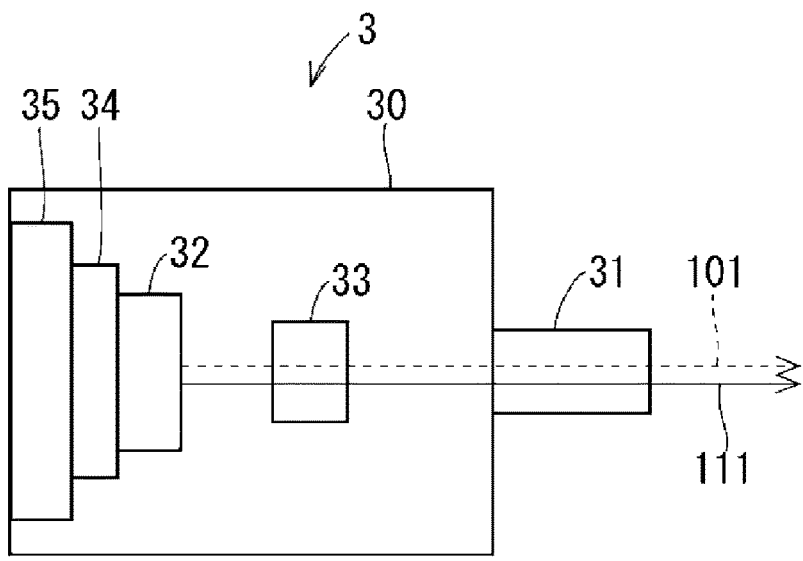
FIG. 2 is a schematic diagram of a light source unit illustrating its example structure.

FIG. 2 is a schematic diagram of the light source unit 3 illustrating its example structure. As illustrated in FIGS. 1 and 2, the light source unit 3 includes, for example, a housing 30 accommodating multiple components and a connector 31 connected to the housing 30. The connector 31 is fitted to a connector 23 (refer to FIG. 1) in the light-emitting member 2. The housing 30 and the connector 31 may be made of a resin or another material.

The housing 30 accommodates, for example, a light source 32, an optical system 33, a wiring board 34, and a heat dissipator 35. FIG. 2 illustrates the inside of the housing 30. The light source 32 emits, for example, first mixed light 101 and first excitation light 111. The first mixed light 101 and the first excitation light 111 pass through the optical system 33 and enter the connector 31. The optical system 33 includes, for example, at least one lens. The first mixed light 101 and the first excitation light 111 are emitted outside the light source unit 3 through the connector 31. The first mixed light 101 and the first excitation light 111 emitted through the connector 31 enter each optical fiber 20 in the light-emitting member 2.

The light source 32 is, for example, a surface mount component mounted on the wiring board 34. The wiring board 34 includes wiring for supplying power to the light source 32. The light source 32 receives power through the wiring board 34. The wiring board 34 is, for example, a metal core board and transfers heat generated in the light source 32 to the heat dissipator 35. The heat dissipator 35 is made of, for example, metal. The heat dissipator 35 is partially exposed from the housing 30 and releases heat, which is transferred from the wiring board 34, outside the light source unit 3. Thus, heat generated in the light source 32 can be released outside the light source unit 3.

Figure 3:
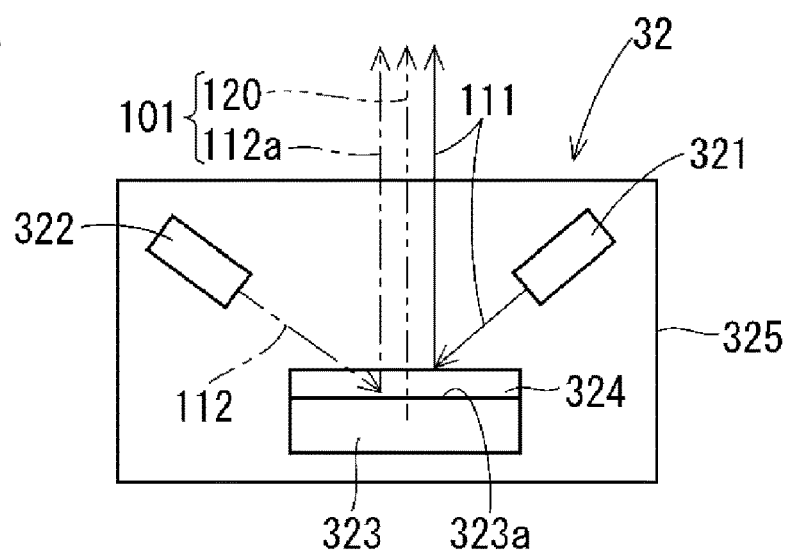
FIG. 3 is a schematic diagram of a light source illustrating its example structure.

FIG. 3 is a schematic diagram of the light source 32 illustrating its example structure. As illustrated in FIG. 3, the light source 32 includes, for example, an excitation light source 321 (also referred to as a first excitation light source 321) that emits first excitation light 111 (also referred to as excitation light 111), an excitation light source 322 (also referred to as a second excitation light source 322) that emits second excitation light 112 (also referred to as excitation light 112), a wavelength converter 323 (also referred to as a light source wavelength converter 323), and an optical filter 324. The excitation light sources 321 and 322, the wavelength converter 323, and the optical filter 324 are accommodated in a package 325 made of a ceramic material or another material. FIG. 3 illustrates the inside of the package 325.

The first excitation light source 321 emits first excitation light 111 toward, for example, the wavelength converter 323. The first excitation light 111 is, for example, visible light. The first excitation light 111 is, for example, laser light. The first excitation light source 321 is, for example, a laser diode (LD). An LD is also referred to as a semiconductor laser. The first excitation light 111 is, for example, violet laser light. The first excitation light 111 has a peak wavelength of, for example, 380 to 430 nm inclusive. The first excitation light 111 may have a peak wavelength of, for example, 405 nm. A peak wavelength of light refers to a wavelength of maximum intensity in the wavelength spectrum of the light. The peak wavelength is also referred to as a peak emission wavelength or an emission peak wavelength. The first excitation light 111 has a wavelength spectrum with a single peak (in other words, a portion including a crest).

The second excitation light source 322 emits second excitation light 112 toward, for example, the wavelength converter 323. The second excitation light 112 is, for example, visible light. The second excitation light 112 is, for example, laser light. The second excitation light source 322 is, for example, an LD. The second excitation light 112 is, for example, blue laser light. The second excitation light 112 has a peak wavelength of, for example, 450 to 490 nm inclusive. The second excitation light 112 may have a peak wavelength of, for example, 465 nm. The second excitation light 112 has a wavelength spectrum with a single peak.

The optical filter 324 is, for example, a dielectric multi-layer film and can reflect the first excitation light 111 and transmit the second excitation light 112. The first excitation light 111 traveling toward the wavelength converter 323 is reflected from the optical filter 324 and enters the optical system 33. The second excitation light 112 traveling toward the wavelength converter 323 passes through the optical filter 324 and is incident on the wavelength converter 323. The optical filter 324 may have a reflectance for the first excitation light 111, for example, greater than or equal to 80, 90, or 95%. The optical filter 324 may have a transmittance for the second excitation light 112, for example, greater than or equal to 80, 90, or 95%.

The wavelength converter 323 can emit, in response to the second excitation light 112, conversion light 120 with a wavelength spectrum different from the wavelength spectrum of the second excitation light 112. The conversion light 120 is, for example, visible light. The conversion light 120 is, for example, yellow visible light.

The wavelength converter 323 includes an incident surface 323a on which the second excitation light 112 is incident. The optical filter 324 may be on the incident surface 323a as in FIG. 3 or may be spaced from the incident surface 323a. The optical filter 324 can transmit the conversion light 120. The conversion light 120 emitted by the wavelength converter 323 passes through the optical filter 324 and enters the optical system 33.

The wavelength converter 323 emits, for example, yellow fluorescence as the conversion light 120 in response to the second excitation light 112. The wavelength converter 323 includes a phosphor (also referred to as a yellow phosphor) that emits yellow fluorescence in response to the second excitation light 112. The wavelength converter 323 may simply be a yellow phosphor bulk or may be made of glass or a ceramic material containing multiple granular yellow phosphors. The conversion light 120 (yellow fluorescence in this example) has a peak wavelength of, for example, 570 to 590 nm inclusive. The conversion light 120 may have a peak wavelength of, for example, 578 nm. The conversion light 120 including one type of fluorescence as in this example may be hereafter referred to as fluorescence 120. The fluorescence 120 has a wavelength spectrum with a single peak. The fluorescence 120 has a longer peak wavelength than the second excitation light 112.

The first mixed light 101 emitted by the light source 32 is a mixture of multiple component light beams with different peak wavelengths. The first mixed light 101 has a wavelength spectrum with, for example, multiple peaks. The first mixed light 101 is, for example, a mixture of a reflection component 112a (also referred to as first component light) of the second excitation light 112 reflected from the incident surface 323a of the wavelength converter 323 and fluorescence 120 (also referred to as second component light) emitted by the wavelength converter 323. In this example, the first component light is blue light, and the second component light is yellow light. The first mixed light 101 is, for example, pseudo white light being a mixture of blue light and yellow light. The first mixed light 101 emitted by the light source 32 enters the optical system 33.

As described above, the light source unit 3 emits pseudo white light in this example. The pseudo white light emitted by the light source unit 3 enters each optical fiber 20 in the light-emitting member 2. The light-emitting member 2 then emits pseudo white light.

In this example, the first excitation light 111 reflected from the optical filter 324 enters each optical fiber 20 through its two ends. The first mixed light 101, which is a mixture of the conversion light 120 emitted by the light source wavelength converter 323 and the second excitation light 112 reflected from the light source wavelength converter 323, passes through the optical filter 324 and enters the optical fiber 20 through its two ends. This structure allows the optical axes of the first excitation light 111 and the first mixed light 101 to be aligned more easily. Thus, both the first excitation light 111 and the first mixed light 101 can efficiently enter the optical fiber 20 through its two ends.

Example Structure of Light-Emitting Member

Figure 4:
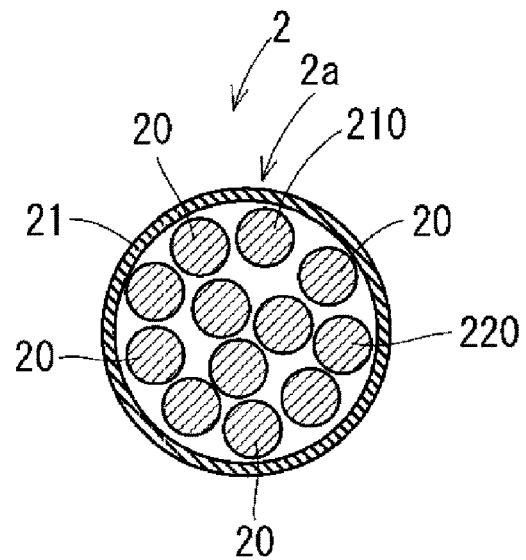
FIG. 4 is a schematic sectional view of a light-emitting member illustrating its example structure.
Figure 5:
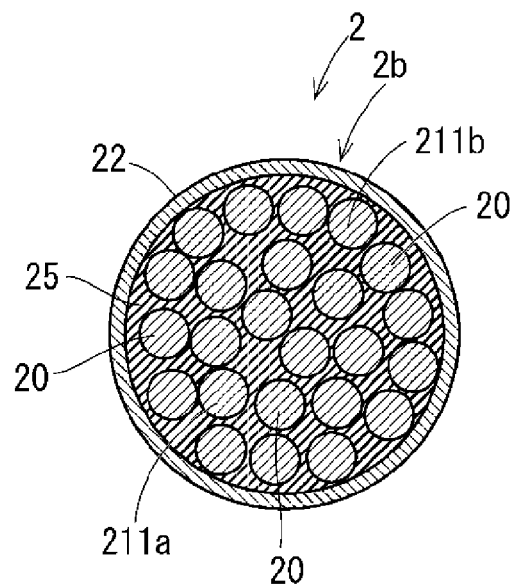
FIG. 5 is a schematic sectional view of the light-emitting member illustrating its example structure.

FIG. 4 is a schematic sectional view of the light-emitting member 2 taken along line A-A in FIG. 1 as viewed in the direction indicated by the arrows, illustrating its example structure. FIG. 5 is a schematic sectional view of the light-emitting member 2 taken along line B-B in FIG. 1 as viewed in the direction indicated by the arrows, illustrating its example structure. As illustrated in FIGS. 1, 4, and 5, the light-emitting member 2 includes, for example, multiple optical fibers 20, a first cover 21 and a second cover 22 covering the multiple optical fibers 20, and the connector 23 to be fitted to the connector 31 in the light source unit 3. The light-emitting member 2 includes twelve optical fibers 20 in this example. The light-emitting member 2 may include any number of optical fibers 20.

As illustrated in FIG. 1, each optical fiber 20 is bent with one end 200a being aligned with the other end 200b. In other words, each optical fiber 20 is bent to have its two ends aligned with each other. The optical fiber 20 as viewed from one end 200a to the other end 200b extends, for example, linearly from one end 200a, bends in a loop, and then extends linearly to the other end 200b. Each optical fiber 20 includes, for example, a looped portion 210 and a pair of straight portions 211a and 211b that are parallel to each other. The straight portion 211a extends from one end of the looped portion 210 to one end 200a of the optical fiber 20. The straight portion 211a includes one end 200a of the optical fiber 20. The straight portion 211b extends from the other end of the looped portion 210 to the other end 200b of the optical fiber 20. The straight portion 211b includes the other end 200b of the optical fiber 20. The looped portion 210 is a rectangular loop in this example. The looped portion 210 may be a circular loop, an elliptical loop, or a polygonal loop other than a quadrangular loop.

The multiple optical fibers 20 are bundled with the first cover 21 and the second cover 22. As illustrated in FIGS. 1 and 4, the tubular first cover 21 collectively covers the looped portions 210 of the multiple optical fibers 20 in their extending direction. The first cover 21 forms a loop corresponding to the shape of the looped portion 210. The first cover 21 is made of, for example, a soft transparent resin. Light emitted through the side surfaces of the optical fibers 20 passes through the first cover 21. The first cover 21 may be made of, for example, polyolefin or another material.

As illustrated in FIGS. 1 and 5, the tubular second cover 22 collectively covers pairs of the straight portions 211a and 211b of the optical fibers 20. The second cover 22 covers the optical fibers 20 each being a pair of straight portions 211a and 211b including the two ends of the optical fiber 20. Thus, the cross sections of the optical fibers 20 in the sectional view in FIG. 5 is twice as many as those in the sectional view in FIG. 4. The second cover 22 is made of, for example, metal. Light emitted through the side surfaces of the optical fibers 20 does not pass through the second cover 22. A filler 25 fills the space inside the tubular second cover 22. The filler 25 is made of, for example, a highly heat-resistant resin. The filler 25 may be made of an epoxy resin or another material. The filler 25 and the second cover 22 holds the straight portions 211a and 211b of the optical fibers 20 in shape.

The straight portions 211a and 211b of the optical fibers 20 each include a predetermined portion extending from a substantially middle position in the longitudinal direction to one end 200a or the other end 200b. Such predetermined portions and a portion of the second cover 22 covering the predetermined portions are accommodated in the connector 23. When the connector 23 is fitted to the connector 31 in the light source unit 3, the first mixed light 101 and the first excitation light 111 emitted through the connector 31 enter the optical fibers 20 through the first and second ends 200a and 200b of each optical fiber 20 in the connector 23. In this example, one end 200a of each optical fiber 20 is a first incident end face that receives the first mixed light 101 and the first excitation light 111. the other end 200b of each optical fiber 20 is a second incident end face that receives the first mixed light 101 and the first excitation light 111. In this example, the first mixed light 101 enters the optical fibers 20 through the two ends of each optical fiber 20, and the first excitation light 111 enters the optical fibers 20 through the two ends of each optical fiber 20.

In FIG. 1, the arrows indicate traveling directions 500 in which the first mixed light 101 and the first excitation light 111 travel in the optical fibers 20. The first mixed light 101 and the first excitation light 111 entering each optical fiber 20 through one end 200a propagate in the optical fiber 20 and are emitted from the optical fiber 20 through the other end 200b. The first mixed light 101 and the first excitation light 111 entering each optical fiber 20 through the other end 200b propagate in the optical fiber 20 and are emitted from the optical fiber 20 through one end 200a.

In this example, the filler 25 inside the second cover 22 is made of a highly heat-resistant resin. The filler 25 is thus less likely to deteriorate when heat is generated in the filler 25 exposed to the first mixed light 101 and the first excitation light 111. The second cover 22 is made of metal with a high thermal conductivity. This allows heat generated in the filler 25 exposed to the first mixed light 101 and the first excitation light 111 to be appropriately released outside through the second cover 22. The filler 25 is thus less likely to deteriorate.

Figure 6:
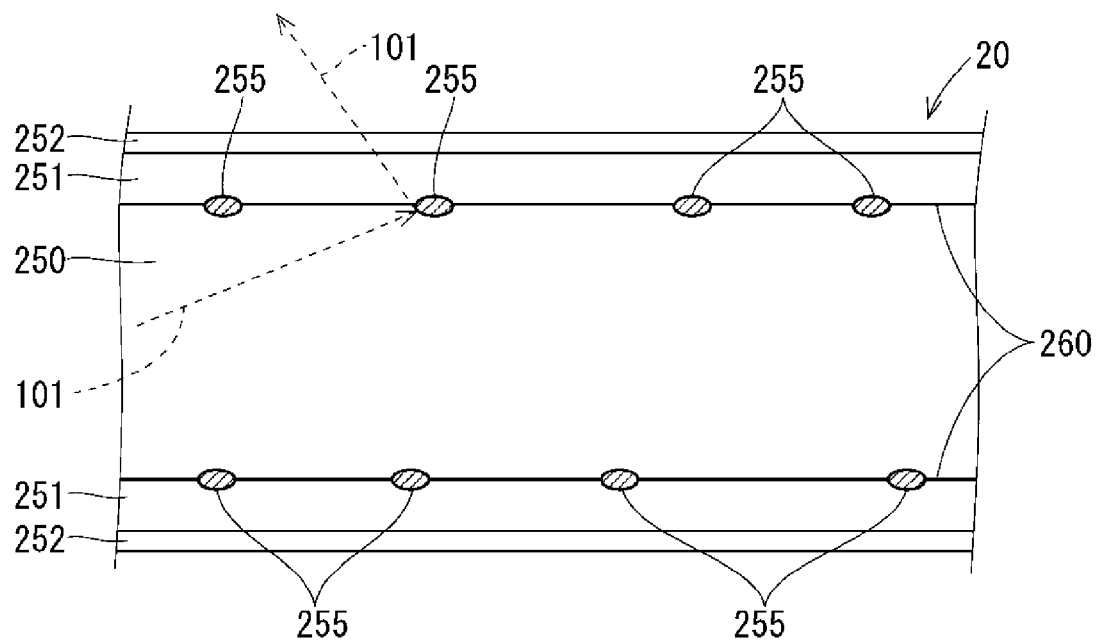
FIG. 6 is a schematic sectional view of an optical fiber illustrating its example structure.

FIG. 6 is a schematic sectional view of the optical fiber 20 taken in the longitudinal direction, illustrating its example structure. As illustrated in FIG. 6, each optical fiber 20 includes, for example, a core 250, a cladding 251 surrounding the core 250, and a lubricating member 252 surrounding the cladding 251. The lubricating member 252 serves as an outer sheath for the optical fiber 20. The lubricating member 252 as an outer sheath for the optical fiber 20 reduces friction between bundled optical fibers 20. This structure allows the bundled optical fibers 20 to be bent more easily. The core 250 may be made of glass or a resin. The cladding 251 may be made of glass or a resin. The first mixed light 101 and the excitation light 111 entering each optical fiber 20 propagate in the core 250. The first mixed light 101 and the excitation light 111 entering the optical fiber 20 through one end 200a propagate in the core 250 and are emitted from the optical fiber 20 through the other end 200b. The first mixed light 101 and the excitation light 111 entering the other end 200b of the optical fiber 20 propagate in the core 250 and are emitted from the optical fiber 20 through one end 200a.

Each optical fiber 20 includes, for example, multiple granular light scatterers 255 that scatter the first mixed light 101 to emit the first mixed light 101 through the side surface of the optical fiber 20. The light scatterers 255 are located at a boundary 260 between the core 250 and the cladding 251. The light scatterers 255 are located across the core 250 and the cladding 251. The first mixed light 101 propagating in the core 250 is scattered after hitting the light scatterers 255 and is emitted from the optical fiber 20 through its side surface. The first mixed light 101 is partly emitted from the optical fiber 20 through the side surface and partly propagates in the core 250 in the optical fiber 20.

The light scatterers 255 are made of, for example, a material that reflects the first mixed light 101. The light scatterers 255 may be made of, for example, a ceramic material, metal, or another material. The light scatterers 255 may have a reflectance for the first mixed light 101, for example, greater than or equal to 80, 90, or 95%. The light scatterers 255 may be located in the core 250 alone in a boundary portion between the core 250 and the cladding 251.

In this example, the optical fiber 20 includes multiple light scatterers 255 in its looped portion 210. The light scatterers 255 are located at the boundary 260 between the core 250 and the cladding 251 in the looped portion 210. The first mixed light 101 is thus emitted through the side surface of the looped portion 210. The first mixed light 101 emitted through the side surface of the looped portion 210 passes through the first cover 21 covering the looped portion 210 and is emitted outside the light-emitting member 2. In the light-emitting member 2, the looped portions 210 of the optical fibers 20 and the first cover 21 covering the looped portions 210 serve as a light-emitting portion 2a that emits the first mixed light 101 outside the light-emitting member 2. The light-emitting portion 2a of the light-emitting member 2 is, for example, elongated and bent in a loop. The light-emitting portion 2a includes linear portions. The multiple light scatterers 255 are located throughout the looped portion 210 in the longitudinal direction. The first mixed light 101 is emitted through an entire area of a tubular side surface (or in other words, a tubular outer circumferential surface) of the light-emitting portion 2a.

In the light-emitting member 2, a portion including pairs of the straight portions 211a and 211b of the optical fibers 20, the second cover 212 covering the straight portions 211a and 211b, and the connector 23 serves as a non-light-emitting portion 2b that emits no first mixed light 101 outside the light-emitting member 2. The straight portions 211a and 211b of each optical fiber 20 may or may not include light scatterers 255. When the straight portions 211a and 211b include the light scatterers 255, the first mixed light 101 is emitted through the side surfaces of the straight portions 211a and 211b. However, the first mixed light 101 does not pass through the second cover 22. Thus, the first mixed light 101 emitted through the side surfaces of the straight portions 211a and 211b is not emitted outside the light-emitting member 2. In this example, the light-emitting member 2 includes the looped light-emitting portion 2a and the straight non-light-emitting portion 2b connected to the light-emitting portion 2a.

The boundary 260 between the core 250 and the cladding 251 may be roughened. In this case, the roughened boundary 260 scatters the first mixed light 101, which is then emitted from the optical fiber 20 through its side surface. The roughened boundary 260 may or may not include light scatterers 255.

A portion 220 of each optical fiber 20 included in the light-emitting portion 2a of the light-emitting member 2 may be hereafter referred to as a fiber light-emitting portion 220. In this example, the fiber light-emitting portion 220 corresponds to the looped portion 210 and is bent in a loop. The fiber light-emitting portion 220 emits the first mixed light 101 through the entire area of its side surface.

Example Structure of Light Emitter for Emitting Less Uneven Color

As described above, the light-emitting portion 2a of the light emitter 1 emits the first mixed light 101 (e.g., pseudo white light). The first mixed light 101 includes, for example, the reflection component 112a of the second excitation light 112 with a shorter peak wavelength and the conversion light 120 with a longer peak wavelength. In other words, the first mixed light 101 includes, for example, first component light with a shorter peak wavelength and second component light with a longer peak wavelength.

The transmission loss of visible light in optical fibers tends to be greater when the transmitted visible light has a shorter peak wavelength. Thus, the transmission loss for the first mixed light 101 transmitted through the optical fibers 20 is greater for the first component light with a shorter peak wavelength than for the second component light with a longer peak wavelength. When the first mixed light 101 is transmitted through the optical fibers 20 over a longer distance, the level of attenuation is greater for the first component light than for the second component light. Thus, the first mixed light 101 emitted from the light-emitting member 2 has an uneven color.

In this example, the first component light is blue light, and the second component light is yellow light. Thus, each optical fiber 20 emits yellowish first mixed light 101 from its portion in which the first component light has a lower intensity than the second component light. In this example, the first mixed light 101 enters the optical fibers 20 through the two ends of each optical fiber 20. The difference between the intensity levels of the first component light and the second component light is then greater at a position nearer a portion close to the middle of the optical fiber 20 in the longitudinal direction than the ends of the optical fiber 20. Thus, the optical fiber 20 emits more yellowish first mixed light 101 from a position nearer the portion close to the middle of the optical fiber 20 in the longitudinal direction than the ends of the optical fiber 20. In particular, the first component light has a much lower intensity level than the second component light in the portion close to the middle of the optical fiber 20 in the longitudinal direction. Thus, the portion close to the middle of the optical fiber 20 in the longitudinal direction emits the first mixed light 101 with a color greatly different from white.

For the first mixed light 101 entering the optical fibers 20 through the two ends of each optical fiber 20 as in this example, the loss of the first component light and the second component light is small in either end portion of the light-emitting portion 2a. Thus, the first mixed light 101 emitted through the two end portions of the light-emitting portion 2a bent in a loop is less likely to have a change in color from the original white color.

Light with a shorter peak wavelength tends to have a greater loss caused by optical fibers that deteriorate over time with heat from, for example, rising ambient temperature. Additionally, light with a shorter peak wavelength tends to have a greater loss caused by optical fibers that deteriorate over time after receiving light with high energy density. The loss caused by such deterioration over time also causes the first mixed light 101 to have an uneven color.

In this example, the fiber light-emitting portion 220 of the optical fiber 20 includes a wavelength converter 271 that emits, in response to the first excitation light 111, fluorescence 131 for complementing the first component light that has a greater loss in the optical fiber 20. Thus, light emitted from the light-emitting portion 2a of the light-emitting member 2 is less likely to have an uneven color.

Figure 7:
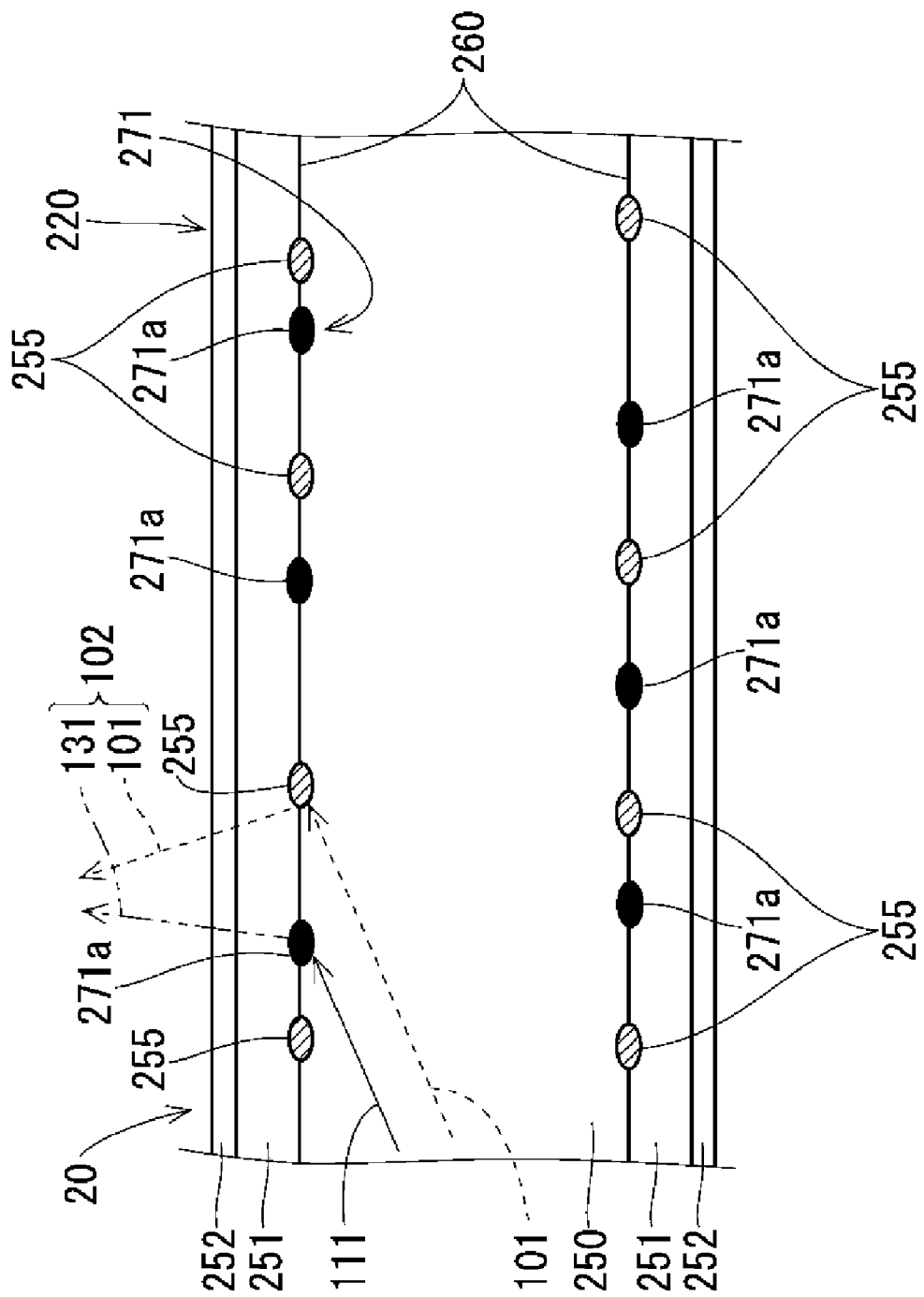
FIG. 7 is a schematic sectional view of the optical fiber illustrating its example structure.

FIG. 7 is a schematic sectional view of a portion of the fiber light-emitting portion 220 including the wavelength converter 271, illustrating its example structure. The wavelength converter 271 emits the fluorescence 131 in response to the first excitation light 111 propagating in the core 250 in the optical fiber 20. The wavelength converter 271 includes, for example, multiple granular phosphors 271a. The phosphors 271a emit the fluorescence 131 in response to the first excitation light 111. The phosphors 271a are located at, for example, the boundary 260 between the core 250 and the cladding 251. The phosphors 271a are located across the core 250 and the cladding 251.

The fluorescence 131 has a peak wavelength closer to the peak wavelength of the first component light, of the peak wavelengths of the first component light and the second component light. In other words, the absolute value of the difference between the peak wavelengths of the fluorescence 131 and the first component light is less than the absolute value of the difference between the peak wavelengths of the fluorescence 131 and the second component light. Thus, the peak wavelength of the fluorescence 131 can be set to a value equal to or close to the peak wavelength of the first component light. The absolute value of the difference between the peak wavelengths of the fluorescence 131 and the first component light may be less than or equal to a half, a third, a fourth, a fifth, or a tenth of the absolute value of the difference between the peak wavelengths of the fluorescence 131 and the second component light. The peak wavelength of the fluorescence 131 may be set to 90 to 110% inclusive of the peak wavelength of the first component light.

The fluorescence 131 has, for example, the same color as the first component light and is blue light. The fluorescence 131 has a peak wavelength of, for example, 450 to 500 nm inclusive. The fluorescence 131 may have a peak wavelength of, for example, 465 nm. The fluorescence 131 has a wavelength spectrum with a single peak.

Second mixed light 102 being a mixture of the fluorescence 131 and the first mixed light 101 is emitted through the side surface of the portion of the fiber light-emitting portion 220 including the wavelength converter 271. Thus, the second mixed light 102 is emitted outside the light emitter 1 through the light-emitting portion 2a of the light-emitting member 2. The second mixed light 102 has a wavelength spectrum with, for example, multiple peaks. The second mixed light 102 corresponds to the first mixed light 101 with the fluorescence 131 complementing the first component light. The first mixed light 101 is emitted, but no fluorescence 131 is emitted, through the side surface of a portion of the fiber light-emitting portion 220 without the wavelength converter 271.

The portion including the wavelength converter 271 in each optical fiber 20 may be hereafter referred to as a fiber complemented portion. The first mixed light 101 with the fluorescence 131 complementing the first component light, or in other words, the second mixed light 102, is emitted from the fiber complemented portion.

In this example, the second mixed light 102 being a mixture of the first mixed light 101 and the fluorescence 131 with a peak wavelength equal to or close to the peak wavelength of the first component light included in the first mixed light 101 is emitted from the light-emitting portion 2a of the light-emitting member 2. This allows the first fluorescence to complement the first component light that has a greater loss in the optical fibers 20. Thus, light emitted from the light-emitting portion 2a of the light-emitting member 2 is less likely to have an uneven color.

The first excitation light 111 for exciting the wavelength converter 271 transmitted through the core 250 is partly scattered by the light scatterers 255 and is emitted through the side surface of the optical fiber 20. The second mixed light 102 thus includes the first excitation light 111. The first excitation light 111 may not affect the color of the second mixed light 102 when, for example, the first excitation light 111 entering the optical fiber 20 has a reduced intensity level.

Figure 8:
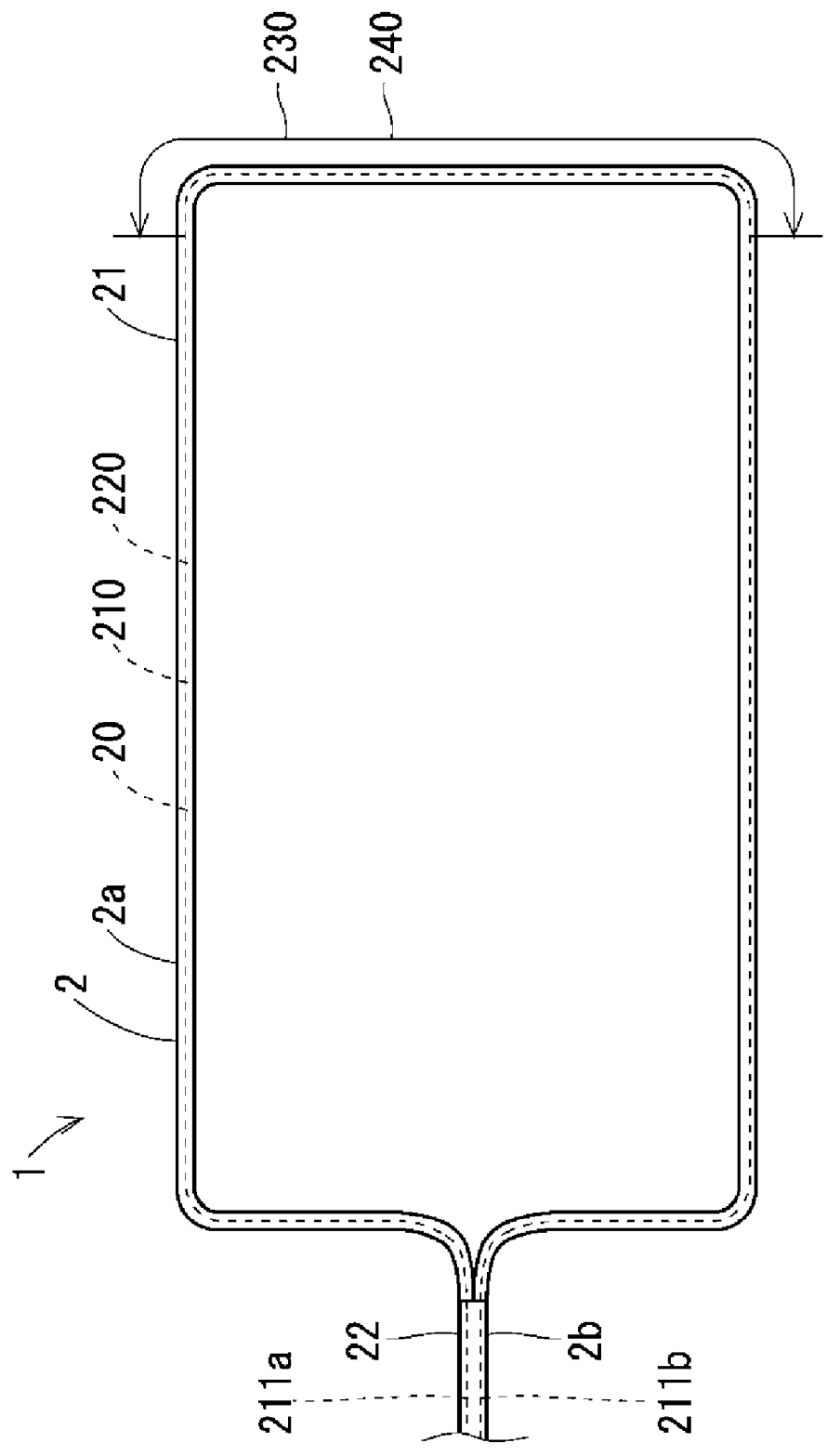
FIG. 8 is a schematic diagram describing the position of a wavelength converter.

The wavelength converter 271 may be located in, for example, a portion of the optical fiber 20 in which the first component light has a much lower intensity level than the second component light. For example, the wavelength converter 271 may be located in a middle portion 230 of the optical fiber 20 in the longitudinal direction as illustrated in FIG. 8. In other words, the phosphors 271a may be located in the middle portion 230 of the optical fiber 20 in the longitudinal direction. The middle portion 230 is included in the fiber light-emitting portion 220. In the example in FIG. 8, the middle portion 230 serves as the fiber complemented portion 240. The middle portion in this example may be, for example, a side farthest from the light source for a light-emitting portion arranged in a substantially quadrangular loop as in the example in FIG. 8. For a light-emitting portion in another shape, the middle portion may be, for example, close to a portion farthest from, or in the middle of, the two ends of the fiber (e.g., a portion including the middle and covering about one tenth the total length of the fiber).

As in this example in which the first mixed light 101 enters the optical fiber 20 through its two ends, when the wavelength converter 271 is located in the middle portion 230 of the optical fiber 20 in the longitudinal direction, the wavelength converter 271 that emits the fluorescence 131 for complementing the first component light can be located in a portion of the optical fiber 20 in which the first component light has a much lower intensity level than the second component light. Thus, light emitted from the light-emitting portion 2a is less likely to have an uneven color.

Figure 9:
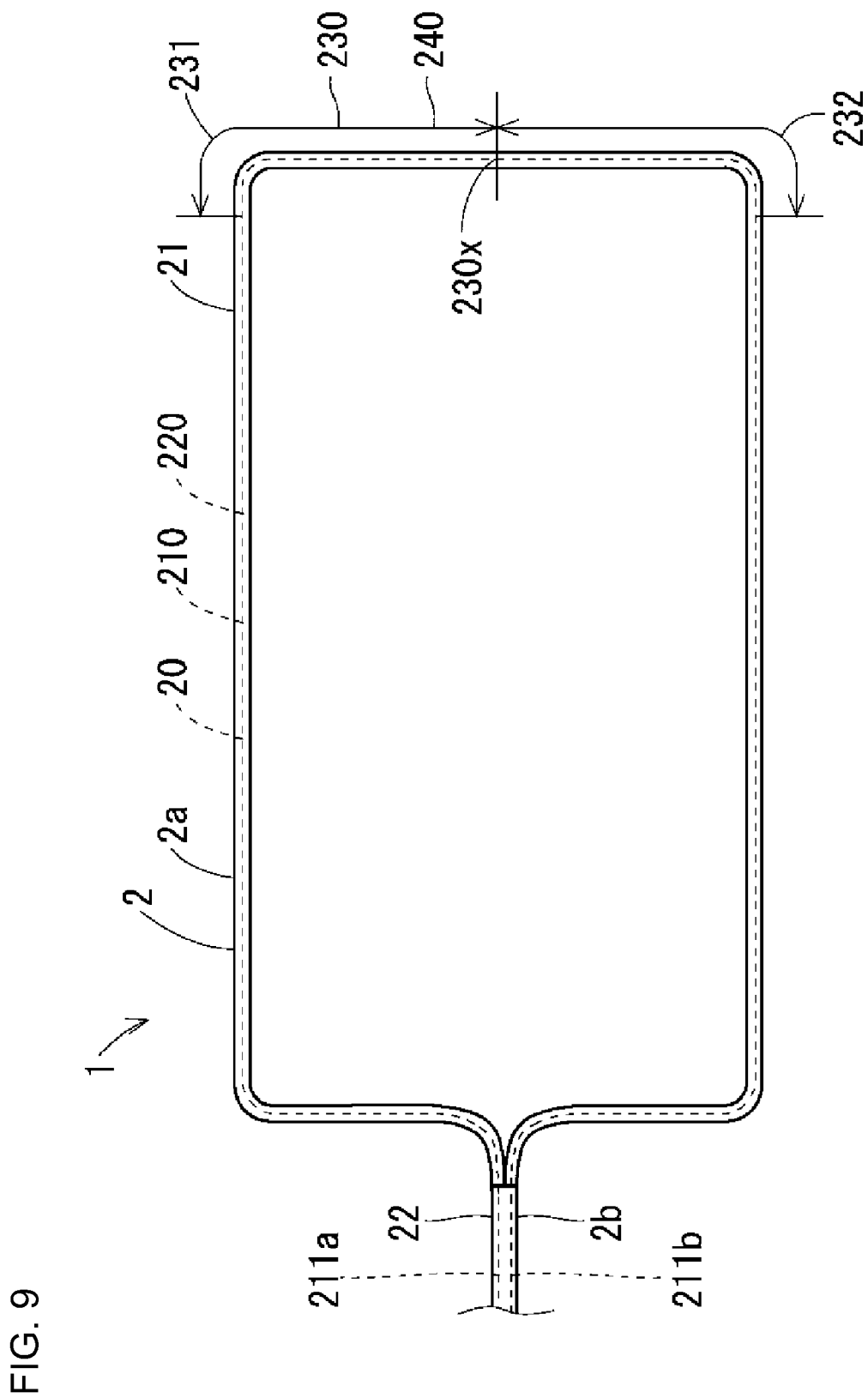
FIG. 9 is a schematic diagram describing the position of the wavelength converter.

The fiber light-emitting portion 220 may include a portion in which the density of the phosphors 271a is lower at a position farther from the middle of the optical fiber 20 in the longitudinal direction. For example, the wavelength converter 271 may be located in the middle portion 230 of the optical fiber 20 in the longitudinal direction as in the example in FIG. 8. In this case, as illustrated in FIG. 9, the middle portion 230 is divided into, for example, a first portion 231 nearer one end 200a of the optical fiber 20 than a middle 230x of the optical fiber 20 in the longitudinal direction and a second portion 232 nearer the other end 200b of the optical fiber 20 than the middle 230x. The density of the phosphors 271a in the first portion 231 is adjusted to be lower at a position farther from the middle 230x, or in other words, nearer one end 200a than the middle 230x, in the first portion 231. Similarly, the density of the phosphors 271a in the second portion 232 is adjusted to be lower at a position farther from the middle 230x, or in other words, nearer the other end 200b than the middle 230x, in the second portion 232. The phosphors 271a may have the same density either in the first portion 231 or in the second portion 232.

Figure 10:
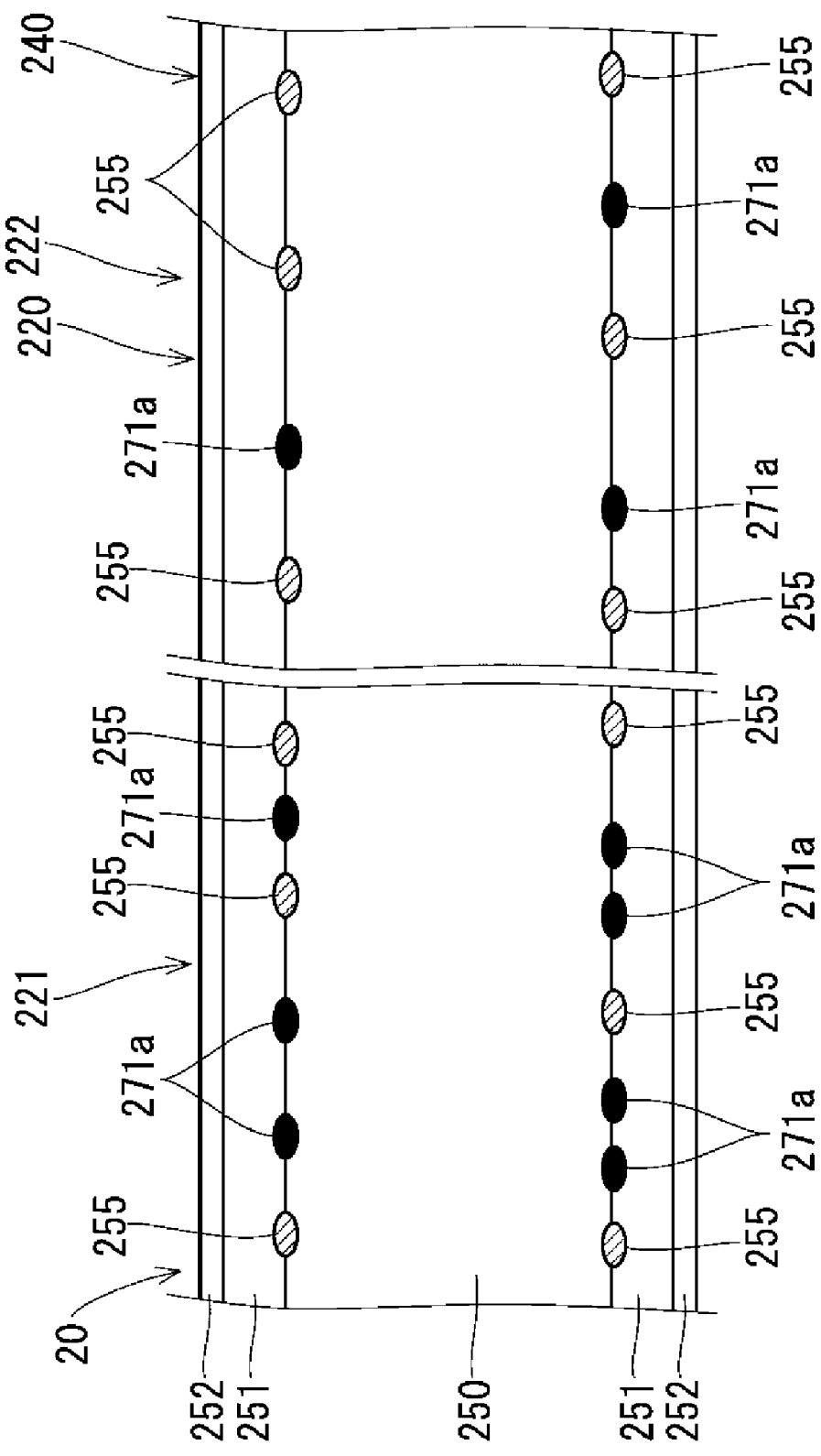
FIG. 10 is a schematic sectional view of the optical fiber illustrating its example structure.

FIG. 10 is a schematic sectional view of the fiber light-emitting portion 220 including a higher-density portion 221 with a higher density of the phosphors 271a and a lower-density portion 222 with a lower density of the phosphors 271a, illustrating its example structure. In FIG. 10, the higher-density portion 221 is on the left and the lower-density portion 222 is on the right. When, for example, the density of the phosphors 271a in the first portion 231 changes in two steps in the example in FIG. 9, a half of the first portion 231 nearer the middle 230x may be the higher-density portion 221 and the remaining half may be the lower-density portion 222. The density of the phosphors 271a in the first portion 231 may change in three or more steps. The lower-density portion with a lower density of the phosphors 271a may include the phosphors 271a with a density of zero, or in other words, the portion may include no phosphors 271a.

As described above, the first component light in the fiber light-emitting portion 220 has a higher intensity level at a position farther from the middle 230x of the optical fiber 20. In other words, the first component light in the fiber light-emitting portion 220 has a higher intensity level at positions nearer the two ends of the optical fiber 20. Thus, the fiber light-emitting portion 220 including a portion in which the density of the phosphors 271a is lower at a position farther from the middle 230x of the optical fiber 20 allows the first component light to be complemented more appropriately with the fluorescence 131. Thus, light emitted from the light-emitting portion 2a of the light-emitting member 2 is less likely to have an uneven color.

The wavelength converter 271 may be located in a portion other than the middle portion 230 of the optical fiber 20. In this case, the wavelength converter 271 may or may not be located in the middle portion 230. The wavelength converter 271 may be located at multiple positions of the fiber light-emitting portion 220 in the longitudinal direction.

Figure 11:
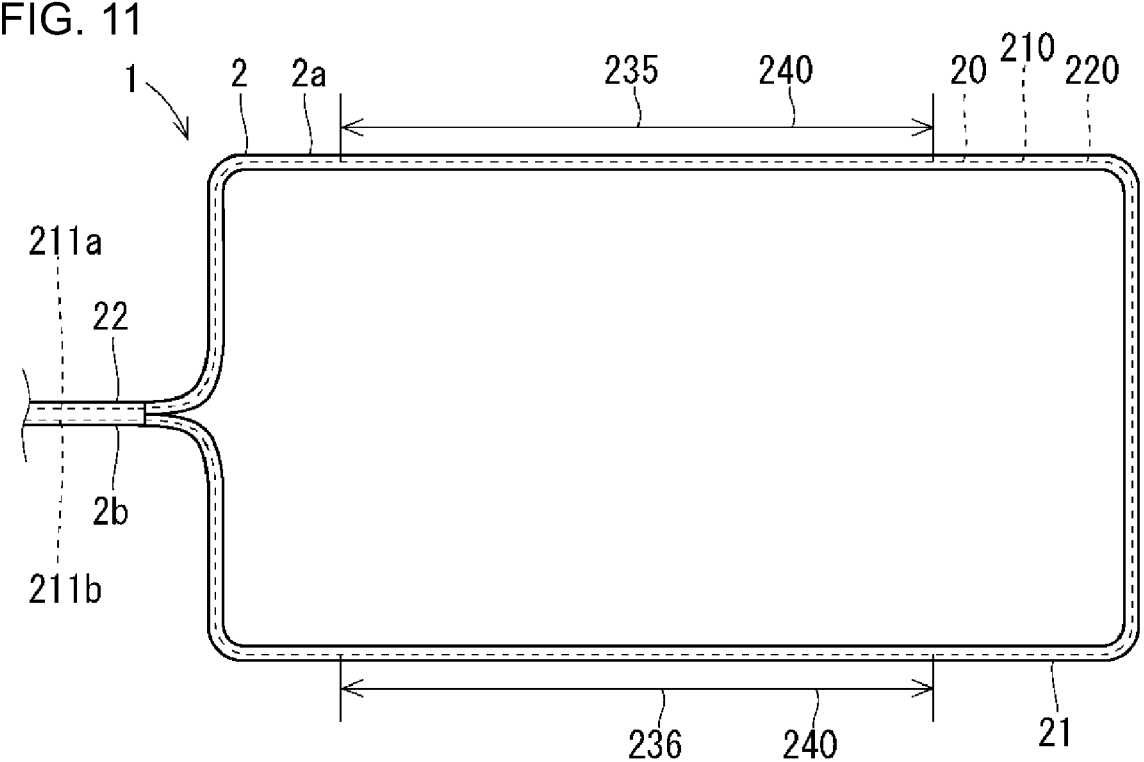
FIG. 11 is a schematic diagram describing the positions of wavelength converters.

FIG. 11 is a schematic diagram illustrating an example structure of the fiber light-emitting portion 220 including wavelength converters 271 at multiple positions in the longitudinal direction. In the example in FIG. 11, a pair of long-side portions 235 and 236 of the fiber light-emitting portion 220 bent in a rectangular loop each include a wavelength converter 271. The long-side portions 235 and 236 each include multiple phosphors 271a. This structure also allows light emitted from the light-emitting portion 2a of the light-emitting member 2 to be less likely to have an uneven color.

In the long-side portion 235, the density of the phosphors 271a may be lower at a position farther from the middle 230x, or in other words, nearer one end 200a. Similarly, in the long-side portion 236, the density of the phosphors 271a may be lower at a position farther from the middle 230x, or in other words, nearer the other end 200b. Either the long-side portion 235 or the long-side portion 236 may include no wavelength converter 271.

The wavelength converters 271 are located in parts of the fiber light-emitting portion 220 in the longitudinal direction in the above example. The wavelength converters 271 may be located throughout the fiber light-emitting portion 220 in the longitudinal direction. In this case as well, the fiber complemented portion 240 may include a portion in which the density of the phosphors 271a is lower at a position farther from the middle 230x.

Figure 12:
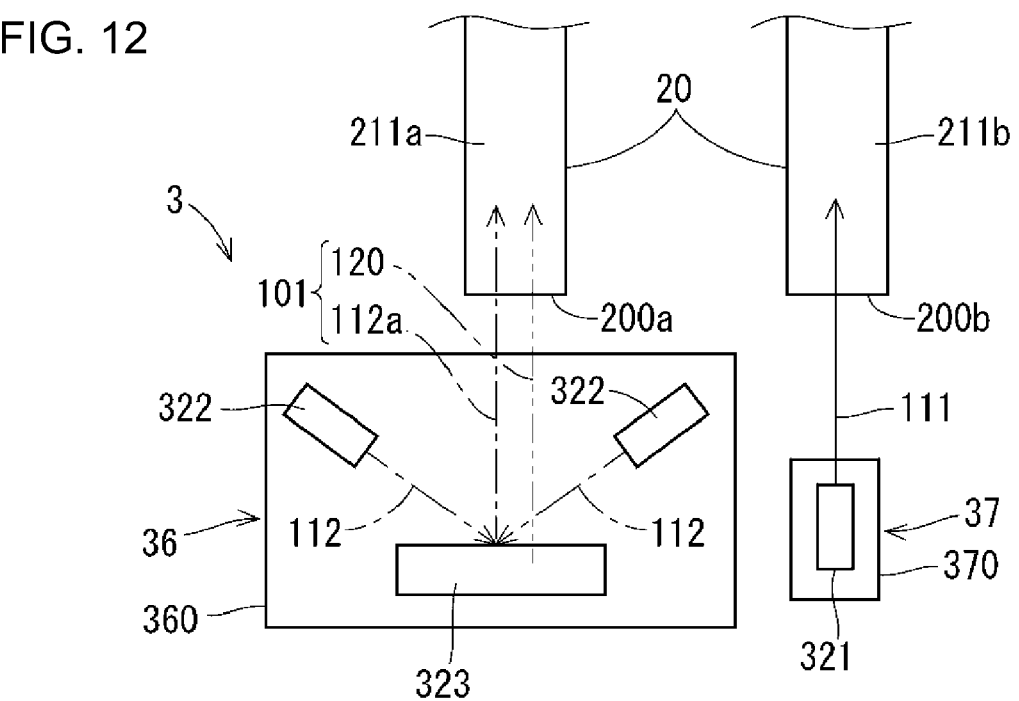
FIG. 12 is a schematic diagram of a light source unit illustrating its example structure.

Although the first mixed light 101 and the first excitation light 111 enter each optical fiber 20 through its two ends in the above examples, the first mixed light 101 may enter the optical fiber 20 through one end 200a, and the first excitation light 111 may enter the optical fiber 20 through the other end 200b. FIG. 12 is a schematic diagram of a light source unit 3 in this case, illustrating its example structure. The light source unit 3 illustrated in FIG. 12 may be hereafter referred to as a second light source unit 3, and the light source unit 3 illustrated in FIGS. 2 and 3 may be referred to as a first light source unit 3. The second light source unit 3 corresponds to the first light source unit 3 with light sources 36 and 37 in place of the light source 32.

The light source 36 emits first mixed light 101. The light source 36 includes, for example, two excitation light sources 322 and a wavelength converter 323. The two excitation light sources 322 and the wavelength converter 323 are accommodated in a package 360 made of, for example, a ceramic material or another material. The light source 36 corresponds to the light source 32 illustrated in FIG. 3 including the excitation light sources 322 in place of the excitation light source 321 and eliminating the optical filter 324. FIG. 12 illustrates the inside of the package 360. The light source 36 may include a single excitation light source 321.

The light source 37 emits first excitation light 111. The light source 37 includes, for example, the excitation light source 321 described above. The excitation light source 321 is accommodated in a package 370 made of, for example, metal. The light source 37 is accommodated in the package 370 separate from the package 360 for the light source 36 and is separate from the light source 36.

The first mixed light 101 emitted by the light source 36 passes through the corresponding optical system 33 and enters each optical fiber 20 through one end 200a. The first excitation light 111 emitted by the light source 37 passes through the corresponding optical system 33 and enters each optical fiber 20 through the other end 200b. In FIG. 12, the optical systems 33 are not illustrated.

With the second light source unit 3 separately including the light source 36 that emits the first mixed light 101 and the light source 37 that emits the first excitation light 111, the optical axes of the first mixed light 101 and the first excitation light 111 can be adjusted individually. Thus, the first mixed light 101 can efficiently enter the optical fiber 20 through one end 200a, and the first excitation light 111 can efficiently enter the optical fiber 20 through the other end 200b.

In a structure separately including the light source 36 that emits the first mixed light 101 and the light source 37 that emits the first excitation light 111 as in the example in FIG. 12, an optical system may be used to change the traveling direction of at least one of the first mixed light 101 or the first excitation light 111 to cause the first mixed light 101 and the first excitation light 111 to enter each optical fiber 20 through its two ends. In a structure including the first light source unit 3 illustrated in FIG. 3, an optical system may be used to change the traveling direction of at least one of the first mixed light 101 or the first excitation light 111 to cause the first mixed light 101 to enter each optical fiber 200 through one end 200a and the first excitation light 111 to enter each optical fiber 20 through the other end 200b.

The light emitter 1 in which the first mixed light 101 enters each optical fiber 20 through one end 200a and the first excitation light 111 enters each optical fiber 20 through the other end 200b may be hereafter referred to as a second light emitter 1. The light emitter 1 in which the first mixed light 101 and the first excitation light 111 enter each optical fiber 20 through its two ends may be referred to as a first light emitter 1.

In the second light emitter 1, the first mixed light 101 enters each optical fiber 20 through one end 200a of the two ends. Thus, the difference between the intensity levels of the first component light and the second component light is greater at a position nearer the other end 200b of the optical fiber 20 than one end 200a of the optical fiber 20. Thus, the fiber light-emitting portion 220 of the optical fiber 20 emits the first mixed light 101 that is more yellowish at a position nearer an end portion adjacent to the other end 200b than an end portion adjacent to one end 200a. In particular, the first component light has a much lower intensity level than the second component light in the end portion of the fiber light-emitting portion 220 adjacent to the other end 200b. Thus, the end portion of the fiber light-emitting portion 220 adjacent to the other end 200b emits the first mixed light 101 with a color greatly different from white.

Figure 13:
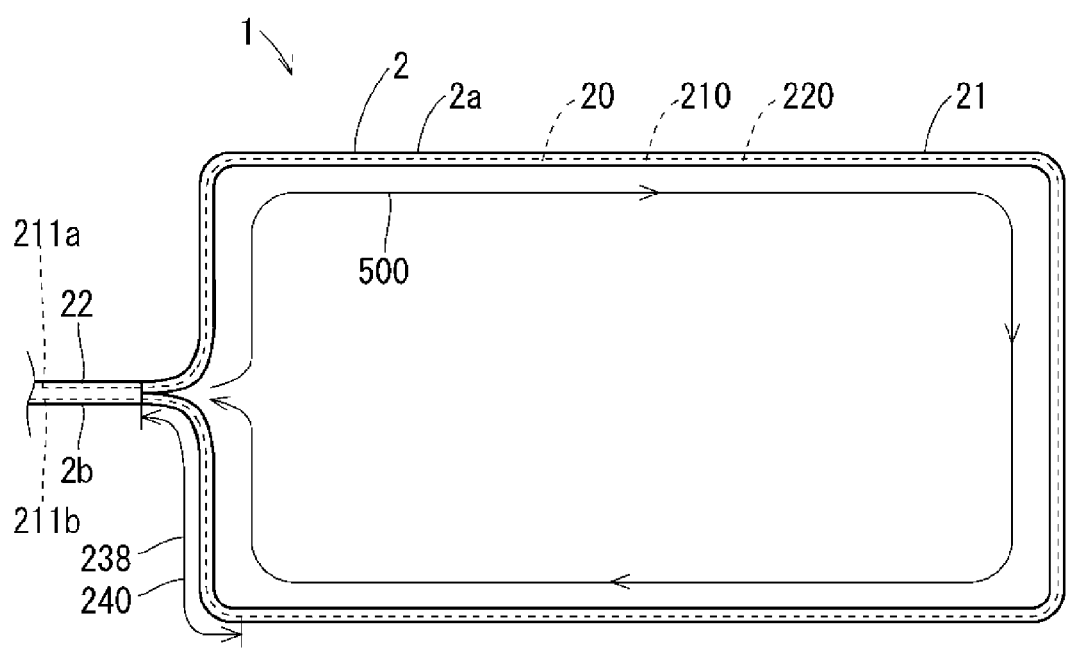
FIG. 13 is a schematic diagram describing the position of a wavelength converter.

Thus, the wavelength converter 271 may be located in an end portion 238 of the fiber light-emitting portion 220 adjacent to the other end 200b as illustrated in FIG. 13. In other words, multiple phosphors 271a may be located in the end portion 238 of the fiber light-emitting portion 220 adjacent to the other end 200b. In this case, the end portion 238 of the fiber light-emitting portion 220 adjacent to the other end 200b serves as the fiber complemented portion 240. In FIG. 13, the arrows indicate the traveling direction 500 of the first mixed light 101 and the first excitation light 111 in the optical fiber 20.

As in this example in which the first mixed light 101 enters the optical fiber 20 through one end 200a, when the wavelength converter 271 is located in the end portion 238 of the fiber light-emitting portion 220 adjacent to the other end 200b, the wavelength converter 271 that emits the fluorescence 131 for complementing the first component light can be located in a portion of the fiber light-emitting portion 220 in which the first component light has a much lower intensity level than the second component light. Thus, light emitted from the light-emitting member 2 is less likely to have an uneven color.

The fiber light-emitting portion 220 may include a portion in which the density of the phosphors 271a is lower at a position farther from the other end 200b of the optical fiber 20. In the example in FIG. 13, the density of the phosphors 271a in the end portion 238 may be adjusted to allow the density of the phosphors 271a to be lower at a position farther from the other end 200b, or in other words, nearer one end 200a, in the end portion 238 of the fiber light-emitting portion 220 adjacent to the other end 200b. In the fiber light-emitting portion 220 of the second light emitter 1, the first component light has a higher intensity level at a position farther from the other end 200b of the optical fiber 20. Thus, when the fiber light-emitting portion 220 includes a portion in which the density of the phosphors 271a is lower at a position farther from the other end 200b of the optical fiber 20, the first component light can be complemented more appropriately with the fluorescence 131. Thus, light emitted from the light-emitting portion 2a is less likely to have an uneven color.

In the second light emitter 1, the wavelength converter 271 may be located in a portion of the fiber light-emitting portion 220 other than the end portion 238. In this case, the wavelength converter 271 may or may not be located in the end portion 238. The wavelength converter 271 may be located at multiple positions of the fiber light-emitting portion 220 in the longitudinal direction. The wavelength converter 271 may be located throughout the fiber light-emitting portion 220 in the longitudinal direction.

In the fiber light-emitting portion 220 of the optical fiber 20, the density of the light scatterers 255 may be adjusted based on the density of the phosphors 271a. The phosphors in this example function as light scatterers that scatter the first mixed light 101. When the fiber complemented portion 240 includes the light scatterers 255 with a uniform density, brighter first mixed light 101 is emitted from a portion with a higher density of the phosphors 271a. Thus, the fiber complemented portion 240 including the light scatterers 255 with a uniform density may cause light emitted from the light-emitting member 2 to have uneven brightness. In the fiber light-emitting portion 220, the fiber complemented portion 240 may thus include the light scatterers 255 with a lower density than a portion other than the fiber complemented portion 240 (also referred to as a fiber non-complemented portion). The fiber complemented portion 240 may include no light scatterers 255.

In one or more embodiments of the present disclosure, the density being higher in one portion than in another portion includes the density being higher in one portion than in another portion with a density of zero. In one or more embodiments of the present disclosure, the density being lower in one portion than in another portion includes the density being lower in one portion with a density of zero than in another portion.

The fiber non-complemented portion includes no phosphors 271a. Thus, the fiber complemented portion includes the phosphors 271a with a density of zero. The fiber complemented portion 240 thus has a higher density of the phosphors 271a than the fiber non-complemented portion. When the fiber complemented portion 240 includes no light scatterers 255, the fiber complemented portion includes the light scatterers 255 with a density of zero. Thus, the fiber complemented portion 240 has a lower density of the light scatterers 255 than the fiber non-complemented portion.

Figure 14:
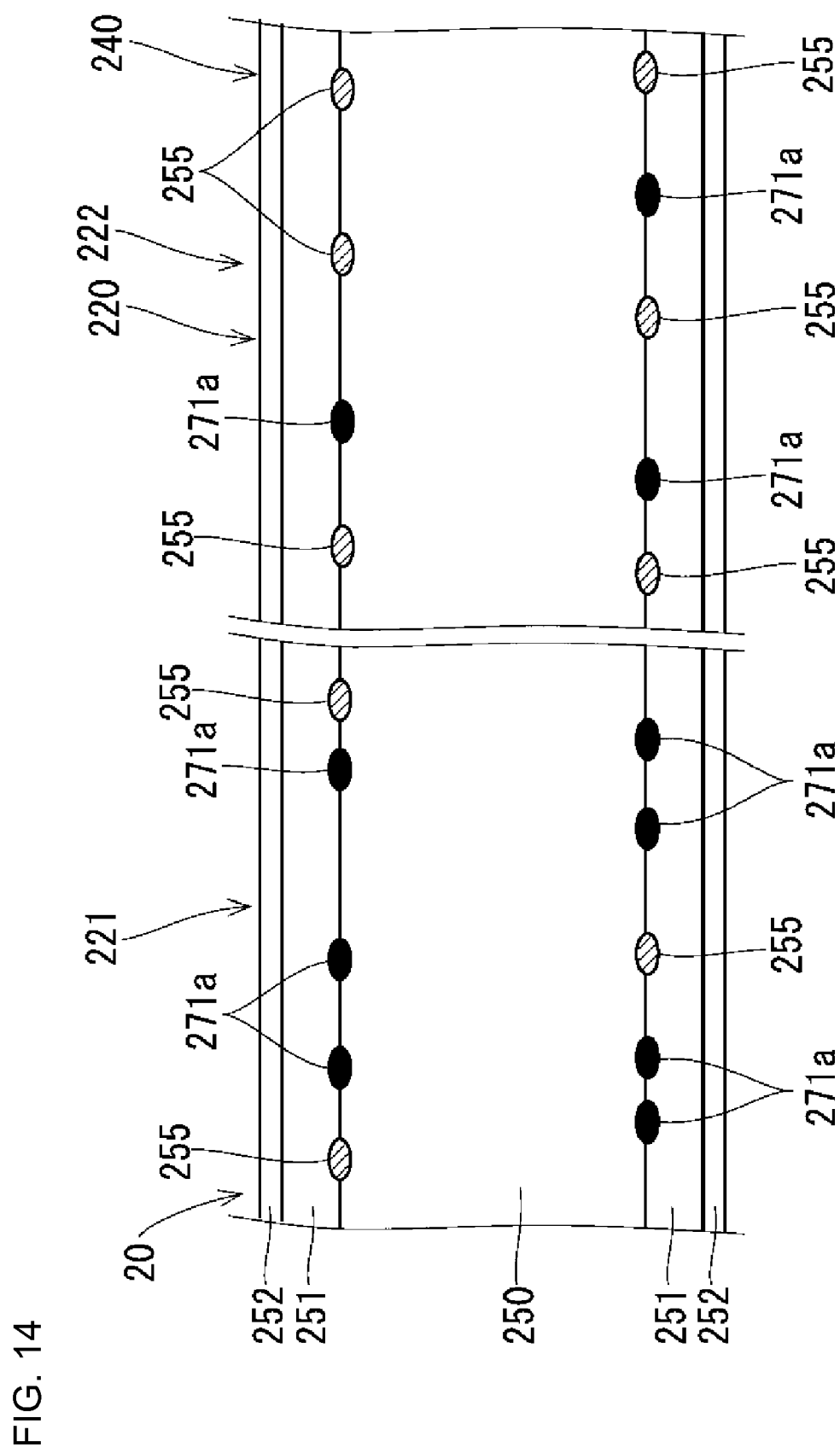
FIG. 14 is a schematic sectional view of the optical fiber illustrating its example structure.

When the density of the phosphors 271a varies in the fiber complemented portion 240, the higher-density portion 221 with a higher density of the phosphors 271a may include the light scatterers 255 with a lower density than the lower-density portion 222 with a lower density of the phosphors 271a. In this case, the higher-density portion 221 may include no light scatterers 255. FIG. 14 is a schematic diagram illustrating an example higher-density portion 221 with a lower density of the light scatterers 255 than the lower-density portion 222. A portion with a lower density of the light scatterers 255 may include the light scatterers 255 with a density of zero, or in other words, the portion may include no light scatterers 255.

Thus, when the density of the phosphors 271a is higher in one portion than in another portion in the optical fiber 20, the density of the light scatterers 255 may be lower in the portion than in the other portion. Light emitted through the side surface of the light-emitting portion 2a of the light-emitting member 2 is less likely to have uneven brightness.

The fiber light-emitting portion 220 of the optical fiber 20 may have different densities of the phosphors 271a in a straight or curved portion and another portion with a smaller bend radius than the straight or curved portion.

Light transmitted through the core of each optical fiber may leak from a curved portion of the optical fiber and may be lost. This loss is referred to as a bending loss. Light is more likely to leak from the curved portion with a smaller bend radius. Light transmitted through the core with a shorter peak wavelength is more likely to leak outside from a curved portion. When such a curved portion includes the phosphors 271a, light emitted from the curved portion may be strongly affected with the color of the first component light. The curved portion may thus emit bluish light that is greatly different from white light.

Figure 15:
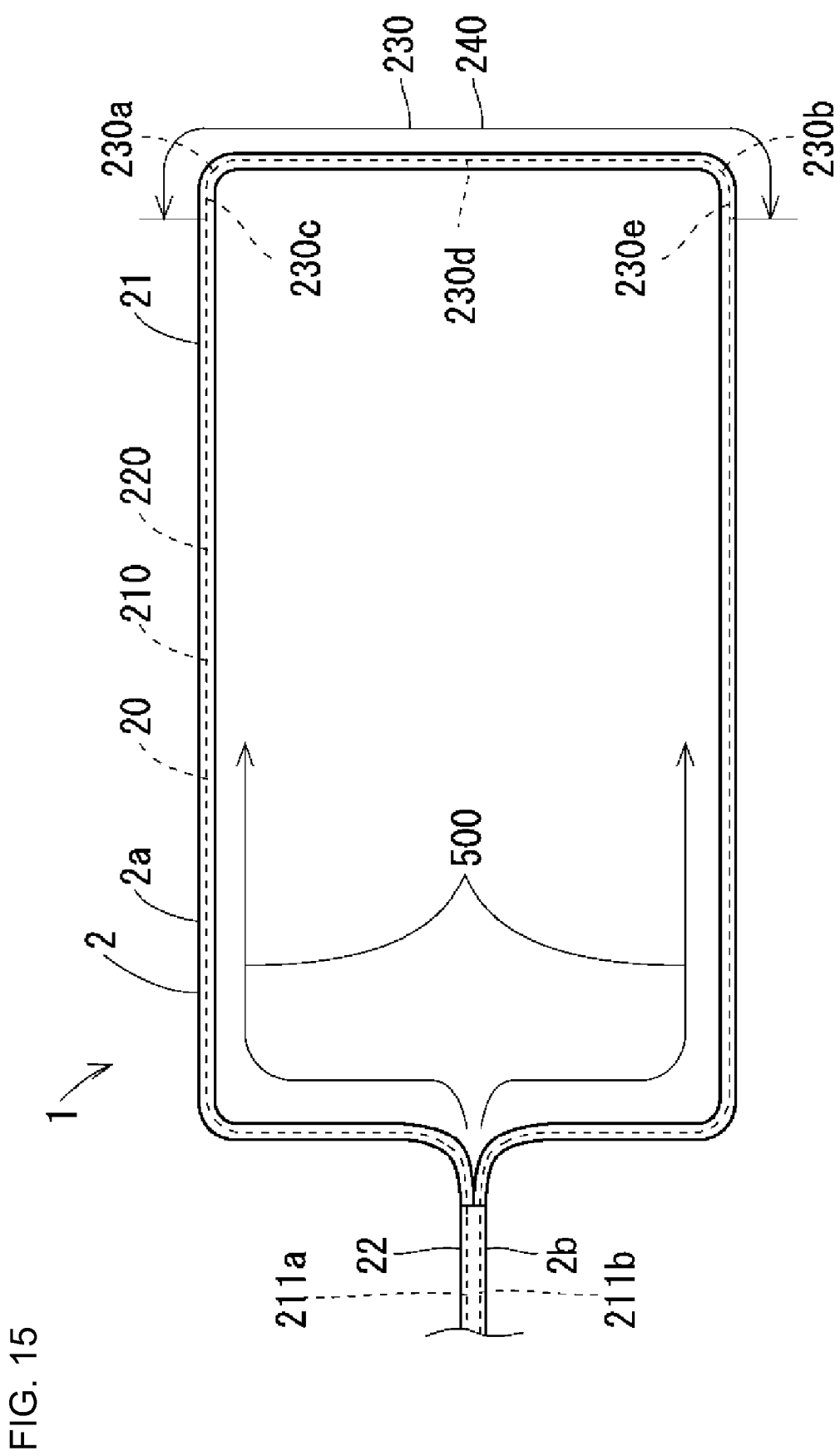
FIG. 15 is a schematic diagram describing the position of a wavelength converter.

In the fiber light-emitting portion 220, a portion with a smaller bend radius than a straight or curved portion may have a lower density of the phosphors 271a than the straight or curved portion. As in the example in FIG. 8, the middle portion 230 of the optical fiber 20 may include the wavelength converter 271, and the middle portion 230 may be the fiber complemented portion 240. As illustrated in FIG. 15, for example, curved portions 230a and 230b included in the middle portion 230 may have a lower density of the phosphors 271a than straight portions 230c, 230d, and 230e included in the middle portion 230. At least one of the curved portions 230a or 230b may include no phosphors 271a.

Figure 16:
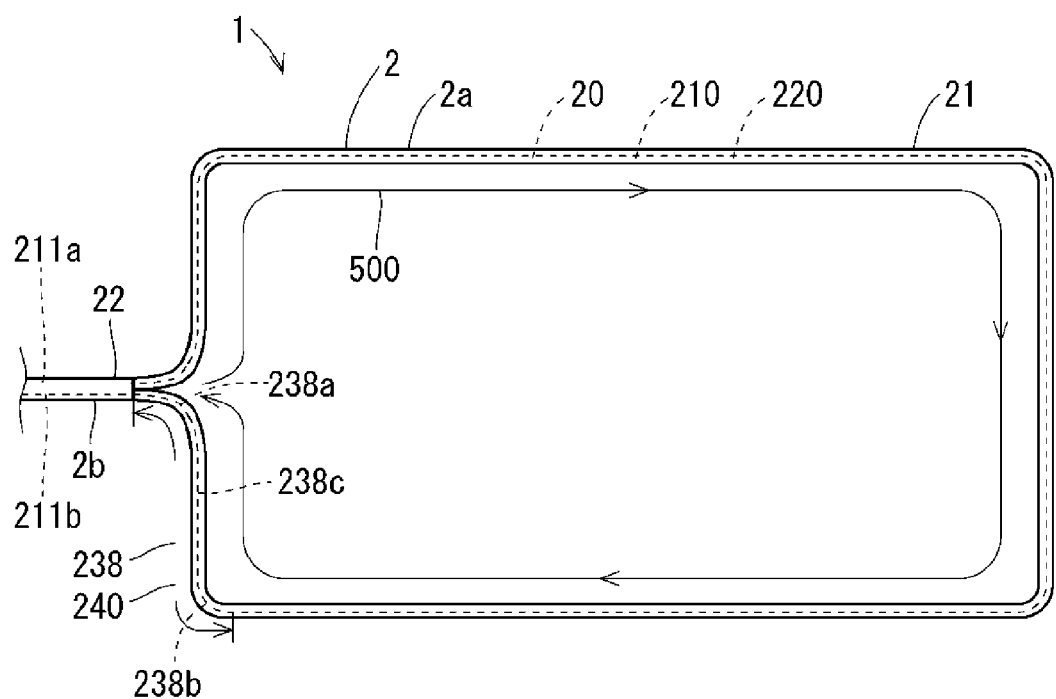
FIG. 16 is a schematic diagram describing the position of a wavelength converter.

As in the example in FIG. 13, the end portion 238 adjacent to the other end 200b of the optical fiber 20 may include the wavelength converter 271, and the end portion 238 may be the fiber complemented portion 240. In this case, as illustrated in FIG. 16, curved portions 238a and 238b included in the end portion 238 may have, for example, a lower density of the phosphors 271a than a straight portion 238c included in the end portion 238. At least one of the curved portions 238a and 238b may include no phosphors 271a.

In the example in FIG. 16, the curved portion 238b with a smaller bend radius may have a lower density of the phosphors 271a than the curved portion 238a having a larger bend radius. The curved portion 238b with a smaller bend radius may include no phosphors 271a. The curved portion 238a may have a higher density of the phosphors 271a than the straight portion 238c, and the straight portion 238c may have a higher density of the phosphors 271a than the curved portion 238b. The curved portion 238 and the straight portion 238c may have a higher density of the phosphors 271a than the curved portion 238b.

In this manner, when a portion with a smaller bend radius than a straight or curved portion of the fiber light-emitting portion 220 has a lower density of the phosphors 271a than the straight or curved portion, light emitted from the portion with a smaller bend radius is less likely to be affected by the color (e.g., blue) of the first component light with a shorter peak wavelength. Thus, light emitted from the light-emitting portion 2a is less likely to have an uneven color.

As described above, the first component light is more likely to leak from a curved portion with a smaller bend radius in the optical fiber 20. In other words, the curved portion with a smaller bend radius has a greater loss of the first component light from the curved portion. This reduces the intensity level of the first component light emitted from a portion located farther in the traveling direction of the first mixed light 101 than the curved portion in the optical fiber 20, possibly causing light emitted from the light-emitting member 2 to have an uneven light.

In the fiber light-emitting portion 220, a portion with a larger bend radius than a curved portion and located farther in the traveling direction 500 of the first mixed light 101 than the curved portion has a higher density of the phosphors 271a than the curved portion. Thus, the loss of the first component light in a curved portion can be complemented with the fluorescence 131 emitted by the phosphors 271a in another portion located farther in the traveling direction 500 of the first mixed light 101 than the curved portion. This allows the other portion to emit the first component light with an appropriate intensity level. Thus, light emitted from the light-emitting portion 2a is less likely to have an uneven color. In the optical fiber in one or more embodiments of the present disclosure, a straight portion may have an infinite bend radius, and a portion with a larger bend radius than a curved portion includes a straight portion.

In the example in FIG. 16 described above, for example, the straight portion 238c and the curved portion 238a have larger bend radiuses than the curved portion 238b and are located farther in the traveling direction 500 of the first mixed light 101 than the curved portion 238b. In this case, the straight portion 238c and the curved portion 238a may have a higher density of the phosphors 271a than the curved portion 238b. The straight portion 238c alone or the curved portion 238a alone may have a higher density of the phosphors 271a than the curved portion 238b.

The example in FIG. 15 described above is described as another example. The first mixed light 101 (also referred to as first input mixed light 101) that enters each optical fiber 20 through one end 200a will be described. The first input mixed light 101 in the middle portion 230 of the optical fiber 20 travels through the straight portion 230c, the curved portion 230a, and the straight portion 230d in this order. Thus, the straight portion 230d is located farther in the traveling direction 500 of the first input mixed light 101 than the curved portion 230a. The straight portion 230d has a larger bend radius than the curved portion 230a. In this case, the straight portion 230d may have a higher density of the phosphors 271a than the curved portion 230a. The curved portion 230a may include no phosphors 271a. The first input mixed light 101 also travels through the straight portion 230d, the curved portion 230b, and the straight portion 230e in this order. Thus, the straight portion 230e is located farther in the traveling direction 500 of the first input mixed light 101 than the curved portion 230b. The straight portion 230e has a larger bend radius than the curved portion 230b. In this case, the straight portion 230e may have a higher density of the phosphors 271a than the curved portion 230b. The curved portion 230b may include no phosphors 271a.

The first mixed light 101 (also referred to as second input mixed light 101) that enters each optical fiber 20 through the other end 200b will be described. The second input mixed light 101 in the middle portion 230 of the optical fiber 20 travels through the straight portion 230e, the curved portion 230b, and the straight portion 230d in this order. Thus, the straight portion 230d is located farther in the traveling direction 500 of the second input mixed light 101 than the curved portion 230b. In this case, the straight portion 230d may have a higher density of the phosphors 271a than the curved portion 230b. The curved portion 230b may include no phosphors 271a. The second input mixed light 101 travels through the straight portion 230d, the curved portion 230a, and the straight portion 230c in this order. Thus, the straight portion 230c is located farther in the traveling direction 500 of the second input mixed light 101 than the curved portion 230a. In this case, the straight portion 230c may have a higher density of the phosphors 271a than the curved portion 230a. The curved portion 230a may include no phosphors 271a.

The first mixed light 101 propagating in the optical fiber 20 has a loss of the second component light in addition to the loss of the first component light. The optical fiber 20 may thus include a wavelength converter 272 that emits fluorescence 132 for complementing the second component light in response to the first excitation light 111. In this case, the light-emitting member 2 emits second mixed light 102 being a mixture of the first mixed light 101, the fluorescence 131, and the fluorescence 132. Thus, light emitted from the light-emitting member 2 may be brighter.

Figure 17:
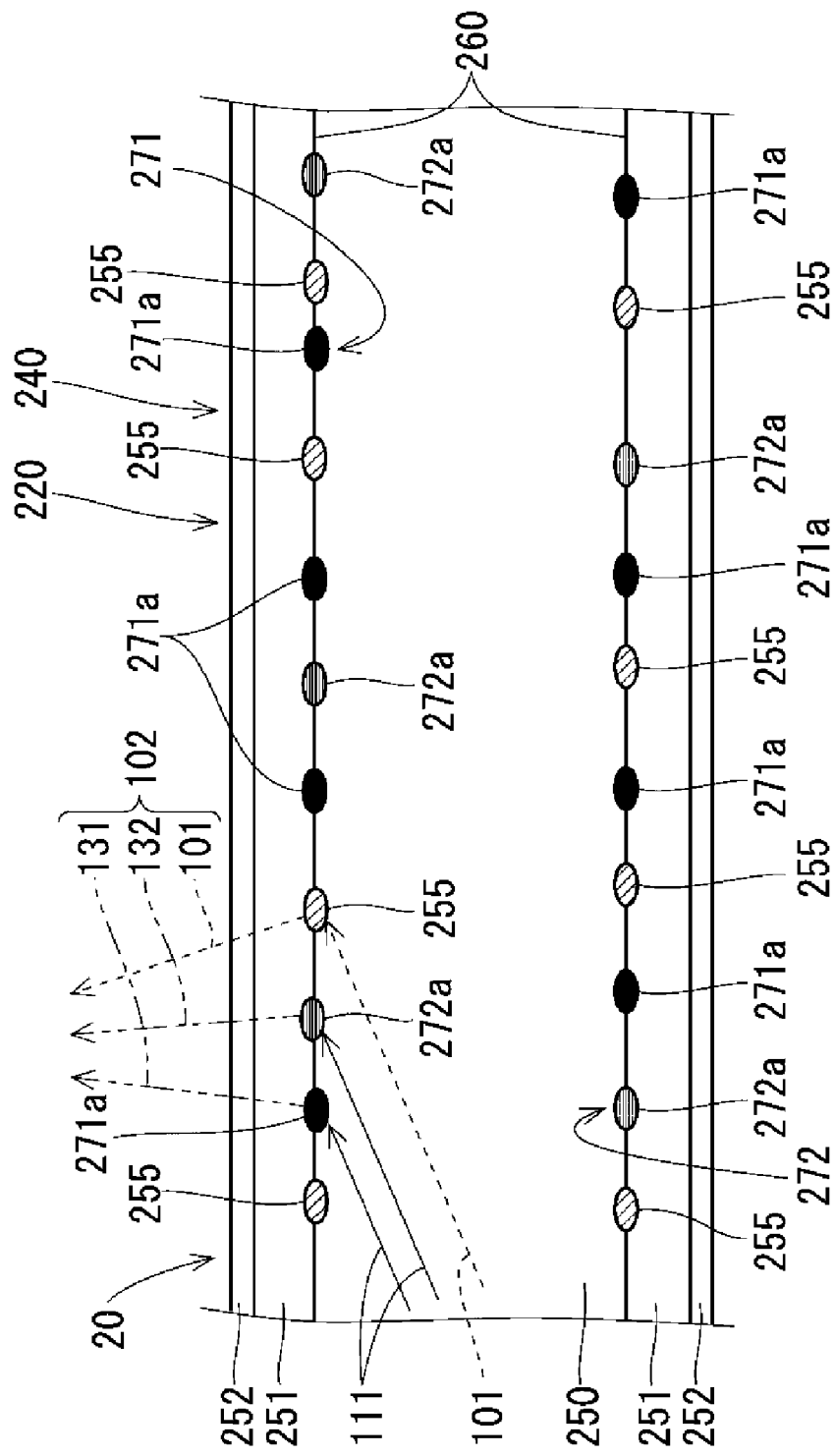
FIG. 17 is a schematic sectional view of an optical fiber illustrating its example structure.

FIG. 17 is a schematic sectional view of the optical fiber 20 including the wavelength converter 272, illustrating its example structure. The wavelength converter 272 includes, for example, multiple granular phosphors 272a. The phosphors 272a emit fluorescence 132 in response to the first excitation light 111. The phosphors 272a are located at, for example, the boundary 260 between the core 250 and the cladding 251.

The fluorescence 132 has a longer peak wavelength than the fluorescence 131. The fluorescence 132 has a peak wavelength closer to, of the peak wavelengths of the first component light and the second component light, the peak wavelength of the second component light. In other words, the absolute value of the difference between the peak wavelengths of the fluorescence 132 and the second component light is less than the absolute value of the difference between the peak wavelengths of the fluorescence 132 and the first component light. Thus, the peak wavelength of the fluorescence 132 can be set to a value equal to or close to the peak wavelength of the second component light. The absolute value of the difference between the peak wavelengths of the fluorescence 132 and the second component light may be less than or equal to a half, a third, a fourth, a fifth, or a tenth of the absolute value of the difference between the peak wavelengths of the fluorescence 132 and the first component light. The peak wavelength of the fluorescence 132 may be set to 90 to 110% inclusive of the peak wavelength of the second component light.

The fluorescence 132 is, for example, the same color as the second component light and is yellow light. The fluorescence 132 has a peak wavelength of, for example, 570 to 590 nm inclusive. The fluorescence 132 may have a peak wavelength of, for example, 578 nm. The fluorescence 132 has a wavelength spectrum with a single peak.

The wavelength converter 272 is located at the same position as the wavelength converter 271 in the fiber light-emitting portion 220 of each optical fiber 20. In other words, the wavelength converter 272 is located in the fiber complemented portion 240. The loss of the second component light is less than the loss of the first component light in the optical fiber 20. Thus, the optical fiber 20 may include the phosphors 272a fewer than the phosphors 271a in the optical fiber 20.

As described above for the phosphors 271a, the fiber light-emitting portion 220 of the first light emitter 1 may include a portion in which the density of the phosphors 272a is lower at a position farther from the middle of the optical fiber 20 in the longitudinal direction.

As described above for the phosphors 271a, the fiber light-emitting portion 220 of the second light emitter 1 may include a portion in which the density of the phosphors 272a is lower at a position farther from the other end 200b of the optical fiber 20.

As described above for the phosphors 271a, when the density of all the phosphors is higher in a portion than in another portion of the fiber light-emitting portion 220, the density of the light scatterers 255 may be lower in the portion than in the other portion. Thus, light emitted through the side surface of the light-emitting portion 2a is less likely to have uneven brightness. In a portion including both the phosphors 271a and 272a, the density of all the phosphors in the portion is the density of the phosphors including the phosphors 271a and 272a. In a portion including the phosphors 271a but not including the phosphors 272a, the density of all the phosphors in the portion corresponds to the density of the phosphors 271a in the portion. In a portion including the phosphors 272a but not including the phosphors 271a, the density of all the phosphors in the portion corresponds to the density of the phosphors 272a in the portion.

As described above for the phosphors 271a, a portion with a smaller bend radius than a straight or curved portion of the fiber light-emitting portion 220 may have a lower density of the phosphors 272a than the straight or curved portion.

As described above for the phosphors 271a, a portion with a larger bend radius than a curved portion and located farther in the traveling direction 500 of the first mixed light 101 than the curved portion of the fiber light-emitting portion 220 may have a higher density of the phosphors 272a than the curved portion.

Figure 18:
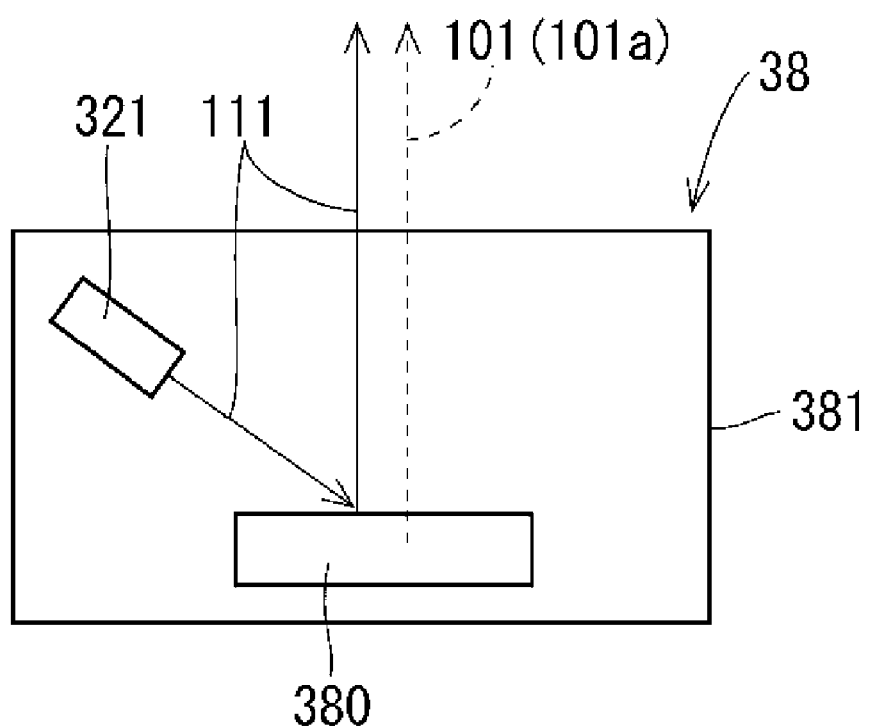
FIG. 18 is a schematic diagram of a light source illustrating its example structure.

Although the light source unit 3 generates pseudo white light by mixing blue light and yellow light in the above examples, pseudo white light may be generated in another manner. For example, the light source unit 3 may mix red light, green light, and blue light to generate pseudo white light. FIG. 18 is a schematic diagram of a light source unit 3 in this case, illustrating its example structure.

The light source unit 3 (also referred to as a third light source unit 3) illustrated in FIG. 18 includes a light source 38 in place of the light source 32 in the first light source unit 3 illustrated in FIGS. 2 and 3. The light source 38 includes, for example, the excitation light source 321 described above and a wavelength converter 380. The excitation light source 321 and the wavelength converter 380 are accommodated in a package 381 made of a ceramic material or another material.

The wavelength converter 380 can emit conversion light with a wavelength spectrum different from the wavelength spectrum of the first excitation light 111 in response to the first excitation light 111. The conversion light emitted by the wavelength converter 380 enters the optical system 33 as first mixed light 101. The wavelength converter 380 emits the first mixed light 101 in response to the first excitation light 111. The first mixed light 101 emitted by the wavelength converter 380 may be hereafter referred to as first mixed light 101a. The first mixed light 101a is, for example, pseudo white light.

The first excitation light 111 is partly reflected from the wavelength converter 380. The excitation light 111 reflected from the wavelength converter 380 enters the optical system 33 together with the first mixed light 101a. The first mixed light 101a and the excitation light 111 pass through the optical system 33 and enter each optical fiber 20 through its two ends. The optical system may be used to change the traveling direction of at least one of the excitation light 111 reflected from the wavelength converter 380 or the first mixed light 101a to cause the excitation light 111 to enter the optical fiber 20 through the other end 200b and the first mixed light 101a to enter the optical fiber 200 through one end 200a.

The wavelength converter 380 includes, for example, a phosphor that emits red fluorescence (also referred to as a red phosphor) in response to the first excitation light 111, a phosphor that emits green fluorescence (also referred to as a green phosphor) in response to the first excitation light 111, and a phosphor that emits blue fluorescence (also referred to as a blue phosphor) in response to the first excitation light 111. The wavelength converter 380 may be made of, for example, glass or a ceramic material containing granular red phosphors, granular green phosphors, and granular blue phosphors. The first mixed light 101a is a mixture of red fluorescence, green fluorescence, and blue fluorescence having peak wavelengths different from one another.

The red phosphor in the wavelength converter 380 emits red fluorescence with a peak wavelength of, for example, 620 to 750 nm inclusive. The red fluorescence may have a peak wavelength of, for example, 740 nm. The red fluorescence has a wavelength spectrum with a single peak.

The green phosphor in the wavelength converter 380 emits green fluorescence with a peak wavelength of, for example, 500 to 570 nm inclusive. The fluorescence emitted by the green phosphor may have a peak wavelength of, for example, 560 nm. The fluorescence emitted by the green phosphor has a wavelength spectrum with a single peak.

The blue phosphor in the wavelength converter 380 emits blue fluorescence with a peak wavelength of, for example, 450 to 490 nm inclusive. The fluorescence emitted by the blue phosphor may have a peak wavelength of, for example, 465 nm. The fluorescence emitted by the blue phosphor has a wavelength spectrum with a single peak.

The first mixed light 101a is a mixture of first component light, second component light having a longer peak wavelength than the first component light, and third component light having a longer peak wavelength than the second component light. In this example, the first component light is blue fluorescence, the second component light is green fluorescence, and the third component light is red fluorescence.

Figure 19:
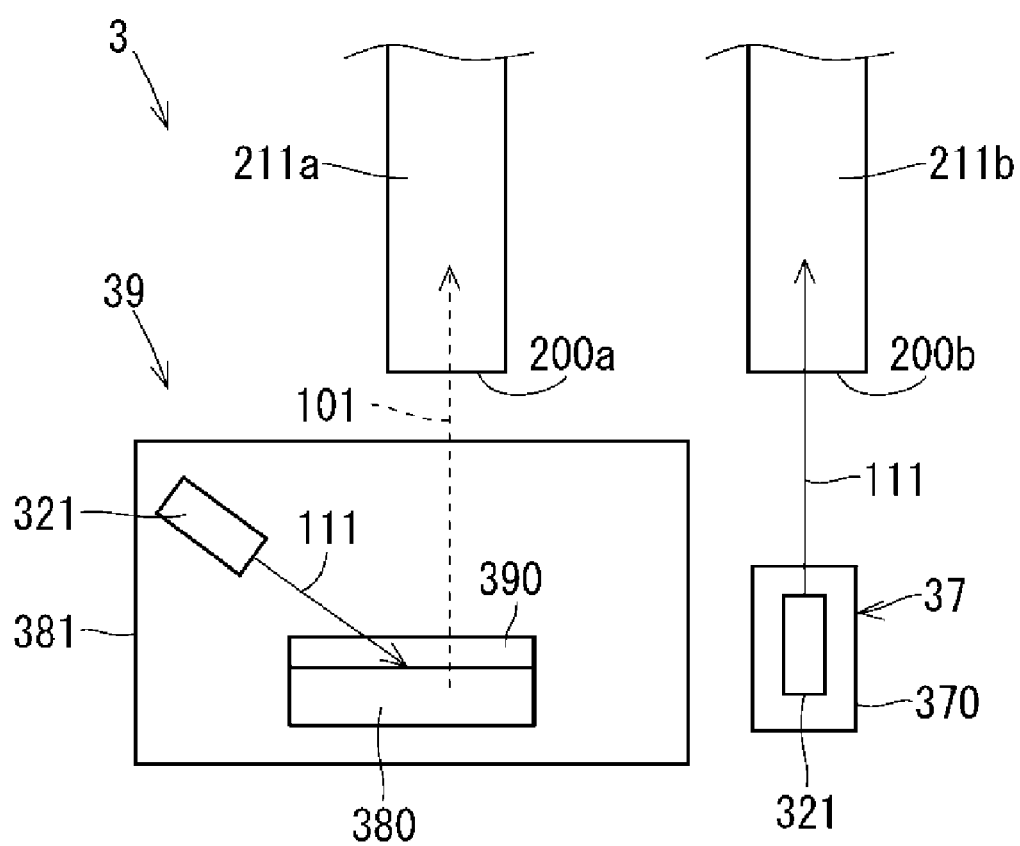
FIG. 19 is a schematic diagram of a light source unit illustrating its example structure.

FIG. 19 is a schematic diagram of a light source unit 3 that mixes red light, green light, and blue light to generate pseudo white light, illustrating another example structure. The light source unit 3 (also referred to as a fourth light source unit 3) illustrated in FIG. 19 includes, for example, a light source 39 and the light source 37 described above. The light source 37 emits excitation light 111 that passes through an optical system 33 and enters the optical fiber 20 though the other end 200b. The optical system 33 is not illustrated in FIG. 19.

The light source 39 corresponds to, for example, the light source 38 illustrated in FIG. 18 with an additional anti-reflection film 390. The anti-reflection film 390 prevents the excitation light 111 from being reflected from the wavelength converter 380. The anti-reflection film 390 includes, for example, a dielectric multilayer film. The excitation light 111 emitted by the excitation light source 321 passes through the anti-reflection film 390 and is incident on the wavelength converter 380. The wavelength converter 380 emits, in response to the excitation light 111, first mixed light 101a, which passes through the anti-reflection film 390 and enters the optical system 33. The first mixed light 101a passes through the optical system 33 and enters the optical fiber 20 through one end 200a. In the fourth light source unit 3, the anti-reflection film 390 prevents the excitation light 111 from entering the optical fiber 20 through one end 200a. An optical system may be used to change the traveling direction of at least one of the first mixed light 101a emitted by the light source 39 or the first excitation light 111 emitted by the light source 37 to cause the first mixed light 101a and the first excitation light 111 to enter the optical fiber 20 through its two ends.

The optical fiber 20 that receives the first mixed light 101a also includes a wavelength converter 271 in the same manner as described above. Thus, the first component light (specifically, blue fluorescence) of the first mixed light 101a is complemented with fluorescence 131 emitted by the wavelength converter 271, and light emitted from the light-emitting member 2 is less likely to have an uneven color.

The optical fiber 20 that receives the first mixed light 101a may include a wavelength converter 272 that emits the fluorescence 132 for complementing the second component light of the first mixed light 101a in the same manner as described above. The second component light of the first mixed light 101a is green light. Thus, the fluorescence 132 is, for example, green light. In this case, a phosphor 272a that emits the fluorescence 132 is a green phosphor, and the wavelength converter 272 includes multiple green phosphors.

The fluorescence 132 for complementing the second component light of the first mixed light 101a has a peak wavelength that is closest to, for example, of the peak wavelengths of the first component light, the second component light, and the third component light, the peak wavelength of the second component light. In other words, the absolute value of the difference between the peak wavelengths of the fluorescence 132 and the second component light is less than the absolute value of the difference between the peak wavelengths of the fluorescence 132 and the first component light and the absolute value of the difference between the peak wavelengths of the fluorescence 132 and the third component light. The absolute value of the difference between the peak wavelengths of the fluorescence 132 and the second component light may be less than or equal to a half, a third, a fourth, a fifth, or a tenth of the absolute value of the difference between the peak wavelengths of the fluorescence 132 and the first component light. The absolute value of the difference between the peak wavelengths of the fluorescence 132 and the second component light may be less than or equal to a half, a third, a fourth, a fifth, or a tenth of the absolute value of the difference between the peak wavelengths of the fluorescence 132 and the third component light. The peak wavelength of the fluorescence 132 may be set to 90 to 110% inclusive of the peak wavelength of the second component light.

The fluorescence 132 for complementing the second component light of the first mixed light 101a has a peak wavelength of, for example, 570 to 590 nm inclusive. The fluorescence 132 may have a peak wavelength of, for example, 560 nm.

The first mixed light 101a propagating in the optical fiber 20 also has a loss of the third component light, in addition to the loss of the first component light and the second component light. The optical fiber 20 may thus include a wavelength converter 273 that emits fluorescence 133 for complementing the third component light. In this case, the light-emitting member 2 emits second mixed light 102 being a mixture of the first mixed light 101a, the fluorescence 131, the fluorescence 132, and the fluorescence 133. Thus, light emitted from the light-emitting member 2 may be brighter. The optical fiber 20 including the wavelength converter 273 may include no wavelength converter 272. In this case, the light-emitting member 2 emits second mixed light 102 being a mixture of the first mixed light 101a, the fluorescence 131, and the fluorescence 133.

Figure 20:
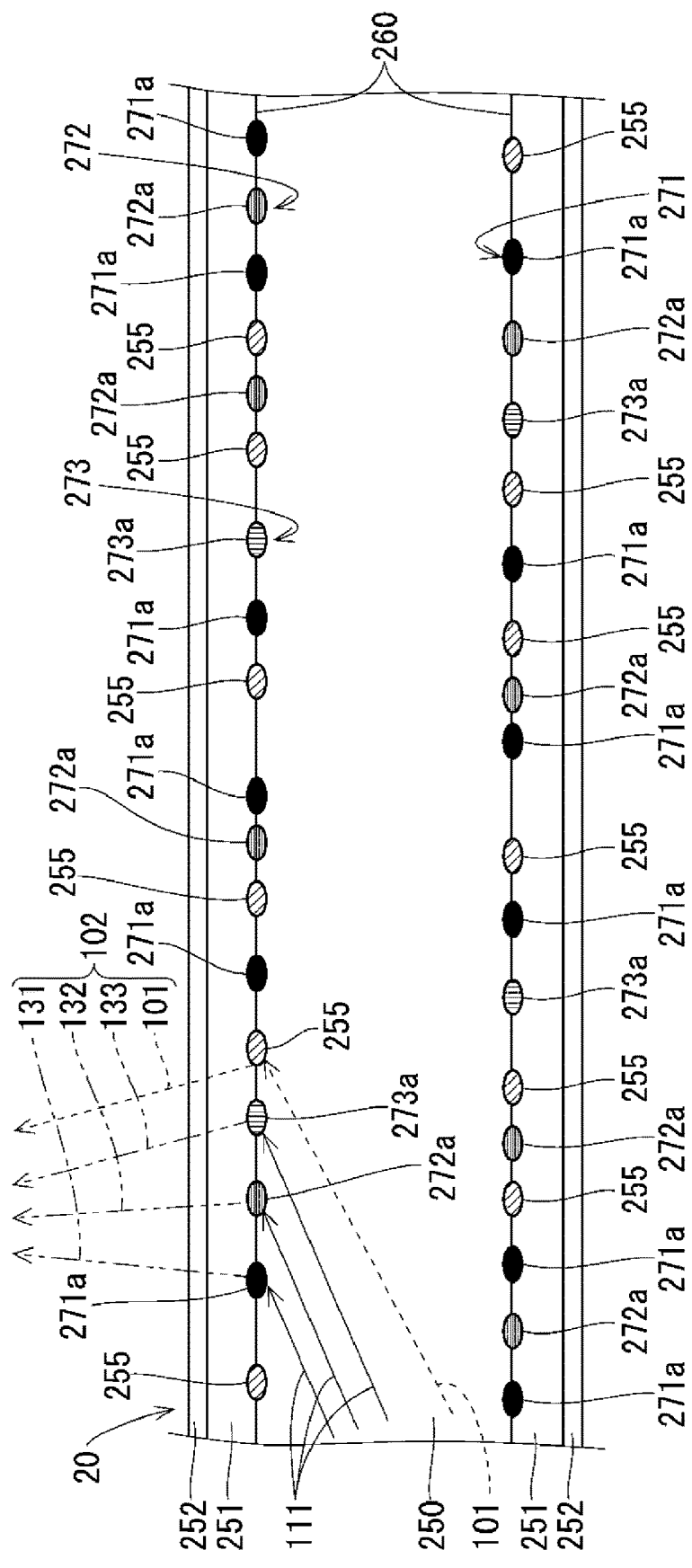
FIG. 20 is a schematic sectional view of an optical fiber illustrating its example structure.

FIG. 20 is a schematic sectional view of the optical fiber 20 including the wavelength converters 271, 272, and 273, illustrating its example structure. The wavelength converter 273 includes, for example, multiple granular phosphors 273a. The phosphors 273a emit fluorescence 133 in response to the first excitation light 111. The phosphors 273a are located at, for example, the boundary 260 between the core 250 and the cladding 251.

The fluorescence 133 has a longer peak wavelength than the fluorescence 131 and the fluorescence 132. The fluorescence 133 has a peak wavelength that is closest to, of the peak wavelengths of the first component light, the second component light, and the third component light, the peak wavelength of the third component light. In other words, the absolute value of the difference between the peak wavelengths of the fluorescence 133 and the third component light is less than the absolute value of the difference between the peak wavelengths of the fluorescence 133 and the second component light. Thus, the peak wavelength of the fluorescence 133 can be set to a value equal to or close to the peak wavelength of the third component light. The third component light has a longer peak wavelength than the second component light, which has a longer peak wavelength than the first component light. Thus, the absolute value of the difference between the peak wavelengths of the fluorescence 133 and the third component light, which is less than the absolute value of the difference between the peak wavelengths of the fluorescence 133 and the second component light, is also less than the absolute value of the difference between the peak wavelengths of the fluorescence 133 and the first component light.

The absolute value of the difference between the peak wavelengths of the fluorescence 133 and the third component light may be less than or equal to a half, a third, a fourth, a fifth, or a tenth of the absolute value of the difference between the peak wavelengths of the fluorescence 133 and the second component light. The peak wavelength of the fluorescence 133 may be set to 90 to 110% inclusive of the peak wavelength of the second component light.

The fluorescence 133 has, for example, the same color as the third component light and is red light. The fluorescence 133 has a peak wavelength of, for example, 620 to 750 nm inclusive. The fluorescence 133 may have a peak wavelength of, for example, 740 nm. The fluorescence 133 has a wavelength spectrum with a single peak.

The wavelength converter 273 is located at the same position as the wavelength converters 271 and 272 in the fiber light-emitting portion 220 of the optical fiber 20. The third component light in the optical fiber 20 has a smaller loss than the first component light and the second component light. Thus, the amount of the phosphors 273a in the optical fiber 20 may be less than the amount of the phosphors 271a in the optical fiber 20. The amount of the phosphors 273a in the optical fiber 20 may also be less than the amount of the phosphors 272a in the optical fiber 20. The amount of the phosphors 273a in the optical fiber 20 may be less than the amount of the phosphors 271a in the optical fiber 20 and the amount of the phosphors 272a in the optical fiber 20 as well.

As described above for the phosphors 271a, the fiber light-emitting portion 220 of the first light emitter 1 that emits first mixed light 101a may include a portion in which the density of the phosphors 273a is lower at a position farther from the middle of the optical fiber 20 in the longitudinal direction.

As described above for the phosphors 271a, the fiber light-emitting portion 220 of the second light emitter 1 that emits first mixed light 101a may include a portion in which the density of the phosphors 273a is lower at a position farther from the other end 200b of the optical fiber 20.

As described above for the phosphors 271a, when the density of all the phosphors is higher in a portion than in another portion of the fiber light-emitting portion 220, the density of the light scatterers 255 may be lower in the portion than in the other portion. The density of all the phosphors in a portion including the phosphors 271a, 272a, and 273a is the density of the phosphors including all the phosphors 271a, 272a, and 273a.

As described above for the phosphors 271a, a portion with a smaller bend radius than a straight or curved portion of the fiber light-emitting portion 220 may have a lower density of the phosphors 273a than the straight or curved portion.

As described above for the phosphors 271a, a portion with a larger bend radius than a curved portion and located farther in the traveling direction 500 of the first mixed light 101a than the curved portion of the fiber light-emitting portion 220 may have a higher density of the phosphors 273a than the curved portion.

Although the light scatterers 255 are located at the boundary 260 between the core 250 and the cladding 251 in the above examples, the light scatterers 255 may be located in the core 250 alone. In this case, the light scatterers 255 may be located, for example, in the core 250 alone in the boundary portion between the core 250 and the cladding 251.

The phosphors such as the phosphors 271a may be located in the core 250 alone. For example, the phosphors may be located in the core 250 alone in the boundary portion between the core 250 and the cladding 251. The phosphors may be located in the cladding 251 alone. For example, the phosphors may be located in the cladding 251 alone in the boundary portion between the core 250 and the cladding 251. When the phosphors in the cladding 251 receive the excitation light 111 scattered by the light scatterers 255, the phosphors can emit light in response to the excitation light 111.

The light source unit 3 may generate pseudo white light in a manner other than the manner described above. In this case, the light source unit 3 may include, for example, an excitation light source that emits blue excitation light and a wavelength converter that emits red fluorescence and green fluorescence in response to the excitation light. This structure can produce pseudo white light being a mixture of a reflection component of the excitation light from the wavelength converter, the red fluorescence, and the green fluorescence. The first mixed light 101 is pseudo white light in the above examples. The first mixed light 101 may be mixed light of another color. The first mixed light 101 may include light with a color other than blue, yellow, green, or red. The first mixed light 101 may be a mixture of four or more light beams with different peak wavelengths.

The light-emitting portion 2a of the light-emitting member 2 is loop-shaped in the above example but may be linear. The light-emitting portion 2a may be bent in a shape other than a loop. The first mixed light 101 and the first excitation light 111 may enter the optical fiber 20 through one end 200a, and no light may enter the optical fiber 20 through the other end 200b.

The light emitter has been described in detail, but the above structures are illustrative in all respects, and the disclosure is not limited to the above structures. All the features of the embodiments described above may be combined in use unless any contradiction arises. Many variations not specifically described above may be implemented without departing from the scope of the disclosure.

REFERENCE SIGNS 1 light emitter
2 light-emitting member
2a light-emitting portion
3 light source unit
32, 36, 37, 38, 39 light source
101, 101a first mixed light
102 second mixed light
111, 112 excitation light
131, 132, 133 fluorescence
271, 272, 273, 323, 380 wavelength converter
271a, 272a, 273a phosphor
321, 322 excitation light source
324 optical filter

The invention claimed is:
1. A light emitter, comprising:
a light source unit configured to emit first excitation light and first mixed light, the first mixed light being a mixture of a plurality of component light beams with different peak wavelengths; and a light-emitting member including an optical fiber configured to receive the first excitation light and the first mixed light, wherein the optical fiber includes a first wavelength converter configured to emit first fluorescence in response to the first excitation light, and emits second mixed light being a mixture of the first mixed light and the first fluorescence through a side surface of the optical fiber, the light-emitting member includes a light-emitting portion configured to emit the second mixed light outside the light-emitting member, the plurality of component light beams includes first component light with a first peak wavelength and second component light with a second peak wavelength longer than the first peak wavelength, and an absolute value of a difference between a first fluorescence peak wavelength of the first fluorescence and the first peak wavelength is less than an absolute value of a difference between the first fluorescence peak wavelength and the second peak wavelength.

2. The light emitter according to claim 1, wherein the first mixed light enters the optical fiber through two ends of the optical fiber in a longitudinal direction of the optical fiber.

3. The light emitter according to claim 2, wherein the first wavelength converter is located at least in a middle portion of the optical fiber in the longitudinal direction.

4. The light emitter according to claim 3, wherein the optical fiber is bent with the two ends being aligned with each other, the light source unit includes
  a first excitation light source configured to emit the first excitation light,
  a second excitation light source configured to emit second excitation light,
  a light source wavelength converter configured to emit conversion light in response to the second excitation light, and
  an optical filter configured to reflect the first excitation light and transmit the second excitation light and the conversion light, the first excitation light is reflected from the optical filter and enters the optical fiber through the two ends, the second excitation light passes through the optical filter and is incident on the light source wavelength converter, and the first mixed light being a mixture of the conversion light emitted by the light source wavelength converter and the second excitation light reflected from the light source wavelength converter passes through the optical filter and enters the optical fiber through the two ends.

5. The light emitter according to claim 3, wherein the optical fiber is bent with the two ends being aligned with each other, the light source unit includes
  a first excitation light source configured to emit the first excitation light, and
  a light source wavelength converter configured to emit the first mixed light in response to the first excitation light, and the first mixed light emitted by the light source wavelength converter and the first excitation light reflected from the light source wavelength converter enter the optical fiber through the two ends.

6. The light emitter according to claim 2, wherein the first wavelength converter includes a plurality of first phosphors configured to emit the first fluorescence in response to the first excitation light, and the optical fiber includes a portion in which a density of the plurality of first phosphors is lower at a position farther from a middle of the optical fiber in the longitudinal direction.

7. The light emitter according to claim 6, wherein the optical fiber is bent with the two ends being aligned with each other, the light source unit includes
  a first excitation light source configured to emit the first excitation light,
  a second excitation light source configured to emit second excitation light,
  a light source wavelength converter configured to emit conversion light in response to the second excitation light, and
  an optical filter configured to reflect the first excitation light and transmit the second excitation light and the conversion light, the first excitation light is reflected from the optical filter and enters the optical fiber through the two ends, the second excitation light passes through the optical filter and is incident on the light source wavelength converter, and the first mixed light being a mixture of the conversion light emitted by the light source wavelength converter and the second excitation light reflected from the light source wavelength converter passes through the optical filter and enters the optical fiber through the two ends.

8. The light emitter according to claim 6, wherein the optical fiber is bent with the two ends being aligned with each other, the light source unit includes
  a first excitation light source configured to emit the first excitation light, and
  a light source wavelength converter configured to emit the first mixed light in response to the first excitation light, and the first mixed light emitted by the light source wavelength converter and the first excitation light reflected from the light source wavelength converter enter the optical fiber through the two ends.

9. The light emitter according to claim 2, wherein the optical fiber is bent with the two ends being aligned with each other, the light source unit includes
  a first excitation light source configured to emit the first excitation light,
  a second excitation light source configured to emit second excitation light,
  a light source wavelength converter configured to emit conversion light in response to the second excitation light, and
  an optical filter configured to reflect the first excitation light and transmit the second excitation light and the conversion light, the first excitation light is reflected from the optical filter and enters the optical fiber through the two ends, the second excitation light passes through the optical filter and is incident on the light source wavelength converter, and the first mixed light being a mixture of the conversion light emitted by the light source wavelength converter and the second excitation light reflected from the light source wavelength converter passes through the optical filter and enters the optical fiber through the two ends.

10. The light emitter according to claim 2, wherein the optical fiber is bent with the two ends being aligned with each other,
the light source unit includes
   a first excitation light source configured to emit the first excitation light, and
   a light source wavelength converter configured to emit the first mixed light in response to the first excitation light, and
the first mixed light emitted by the light source wavelength converter and the first excitation light reflected from the light source wavelength converter enter the optical fiber through the two ends.

11. The light emitter according to claim 1, wherein the first mixed light enters the optical fiber through one end of the optical fiber in a longitudinal direction, and
the first excitation light enters the optical fiber through another end of the optical fiber in the longitudinal direction.

12. The light emitter according to claim 11, wherein the first wavelength converter is located in the optical fiber in an end portion of the light-emitting portion adjacent to the other end.

13. The light emitter according to claim 11, wherein the first wavelength converter includes a plurality of first phosphors configured to emit the first fluorescence in response to the first excitation light, and
the optical fiber includes a portion in which a density of the plurality of first phosphors is lower at a position farther from the other end of the optical fiber.

14. The light emitter according to claim 11, wherein the light source unit includes
   a first light source configured to emit the first mixed light, and
   a second light source configured to emit the first excitation light.

15. The light emitter according to claim 1, wherein the first wavelength converter includes a plurality of first phosphors configured to emit the first fluorescence in response to the first excitation light,
the optical fiber includes a lower-density portion with a lower density of the plurality of first phosphors and a higher-density portion with a higher density of the plurality of first phosphors,
the optical fiber includes a plurality of light scatterers configured to scatter the first mixed light, and
the high-density portion has a lower density of the plurality of light scatterers than the low-density portion.

16. The light emitter according to claim 1, wherein the first wavelength converter includes a plurality of first phosphors configured to emit the first fluorescence in response to the first excitation light,
the optical fiber includes a first portion being straight or curved and a second portion having a smaller bend radius than the first portion, and
the second portion has a lower density of the plurality of first phosphors than the first portion.

17. The light emitter according to claim 1, wherein the first wavelength converter includes a plurality of first phosphors configured to emit the first fluorescence in response to the first excitation light,
the optical fiber includes
   a first portion being curved, and
   a second portion having a larger bend radius than the first portion and located farther in a travelling direction of the first mixed light than the first portion, and
the second portion has a higher density of the plurality of first phosphors than the first portion.

18. The light emitter according to claim 1, wherein the optical fiber includes a second wavelength converter configured to emit, in response to the first excitation light, second fluorescence having a second fluorescence peak wavelength longer than the first fluorescence peak wavelength,
the optical fiber emits the second mixed light being a mixture of the first mixed light, the first fluorescence, and the second fluorescence through the side surface, and
an absolute value of a difference between the second fluorescence peak wavelength and the second peak wavelength is less than an absolute value of a difference between the second fluorescence peak wavelength and the first peak wavelength.

19. The light emitter according to claim 18, wherein the plurality of component light beams includes third component light having a third peak wavelength longer than the second peak wavelength,
the optical fiber includes a third wavelength converter configured to emit, in response to the first excitation light, third fluorescence having a third fluorescence peak wavelength longer than the first fluorescence peak wavelength and the second fluorescence peak wavelength,
the optical fiber emits the second mixed light being a mixture of the first mixed light, the first fluorescence, the second fluorescence, and the third fluorescence through the side surface, and
an absolute value of a difference between the third fluorescence peak wavelength and the third peak wavelength is less than an absolute value of a difference between the third fluorescence peak wavelength and the second peak wavelength.

* * * * *